United States Patent
Han et al.

(10) Patent No.: US 10,775,942 B2
(45) Date of Patent: Sep. 15, 2020

(54) TOUCH SCREEN WITH MINIMAL DEAD SPACE AND DISPLAY DEVICE INCLUDING THE SAME

(71) Applicant: Samsung Display Co., Ltd., Yongin-si (KR)

(72) Inventors: Jeong Yun Han, Yongin-si (KR); Gwang Bum Ko, Yongin-si (KR); Soo Jung Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 15/871,006

(22) Filed: Jan. 14, 2018

(65) Prior Publication Data
US 2018/0373359 A1    Dec. 27, 2018

(30) Foreign Application Priority Data
Jun. 21, 2017   (KR) ......................... 10-2017-0078766

(51) Int. Cl.
   *G06F 3/044*      (2006.01)
   *G06F 3/041*      (2006.01)

(52) U.S. Cl.
   CPC ............ *G06F 3/044* (2013.01); *G06F 3/0416* (2013.01); *G06F 3/0412* (2013.01); *G06F 2203/04112* (2013.01)

(58) Field of Classification Search
   CPC ...... G06F 3/041; G06F 3/0412; G06F 3/0414; G06F 3/044; G06F 3/045; G06F 3/046; G06F 3/047

USPC .................................................. 345/173–179
See application file for complete search history.

(56) References Cited

U.S. PATENT DOCUMENTS

| | | | |
|---|---|---|---|
| 8,970,515 B2 | 3/2015 | Moran et al. | |
| 9,081,453 B2 | 7/2015 | Bulea et al. | |
| 9,733,761 B2 | 8/2017 | Ku et al. | |
| 10,444,900 B2 * | 10/2019 | Ko | G06F 3/044 |
| 10,444,904 B2 * | 10/2019 | Han | G06F 3/0418 |
| 10,503,315 B2 * | 12/2019 | Na | G06F 3/0412 |
| 10,579,191 B2 * | 3/2020 | Ko | G06F 3/044 |
| 10,592,052 B2 * | 3/2020 | Ko | G06F 3/0416 |
| 10,592,056 B2 * | 3/2020 | Lee | H01L 51/5253 |
| 10,613,681 B2 * | 4/2020 | Na | G06F 3/0418 |
| 2013/0314374 A1 | 11/2013 | Kim et al. | |

(Continued)

FOREIGN PATENT DOCUMENTS

| | | |
|---|---|---|
| KR | 10-2011-0127236 | 11/2011 |
| KR | 10-1339692 | 12/2013 |

(Continued)

*Primary Examiner* — Alexander Eisen
*Assistant Examiner* — Nelson Lam
(74) *Attorney, Agent, or Firm* — H.C. Park & Associates, PLC

(57) ABSTRACT

A touch screen includes a base film which includes a sensing area and a non-sensing area; a plurality of first touch electrodes including a plurality of sub-touch electrodes disposed in the sensing area; a plurality of second touch electrodes disposed in the sensing area; first and second sensing lines disposed in the non-sensing area; and a bridge line which is disposed in the non-sensing area and is connected to the first sensing line. The bridge line includes a multilayer structure in which at least two sub-bridge lines are stacked to overlap each other in plan view.

19 Claims, 14 Drawing Sheets

(56) References Cited

U.S. PATENT DOCUMENTS

| | | | | |
|---|---|---|---|---|
| 2014/0145977 | A1* | 5/2014 | Kang | G06F 3/044 |
| | | | | 345/173 |
| 2014/0145979 | A1* | 5/2014 | Lee | G06F 3/0412 |
| | | | | 345/173 |
| 2015/0162387 | A1* | 6/2015 | Gu | G06F 3/0412 |
| | | | | 345/174 |
| 2015/0185940 | A1* | 7/2015 | Han | G06F 3/044 |
| | | | | 345/174 |
| 2016/0054836 | A1* | 2/2016 | Wu | G06F 3/044 |
| | | | | 345/173 |
| 2016/0306475 | A1* | 10/2016 | Cho | G06F 3/044 |
| 2016/0378233 | A1* | 12/2016 | Huo | G06F 3/0412 |
| | | | | 345/174 |
| 2017/0364194 | A1 | 12/2017 | Jang et al. | |
| 2018/0046276 | A1* | 2/2018 | Hou | G06F 3/044 |
| 2018/0143719 | A1* | 5/2018 | Muraoka | G06F 3/0416 |

FOREIGN PATENT DOCUMENTS

| | | |
|---|---|---|
| KR | 10-2016-0084941 | 7/2016 |
| KR | 10-2017-0142243 | 12/2017 |

\* cited by examiner

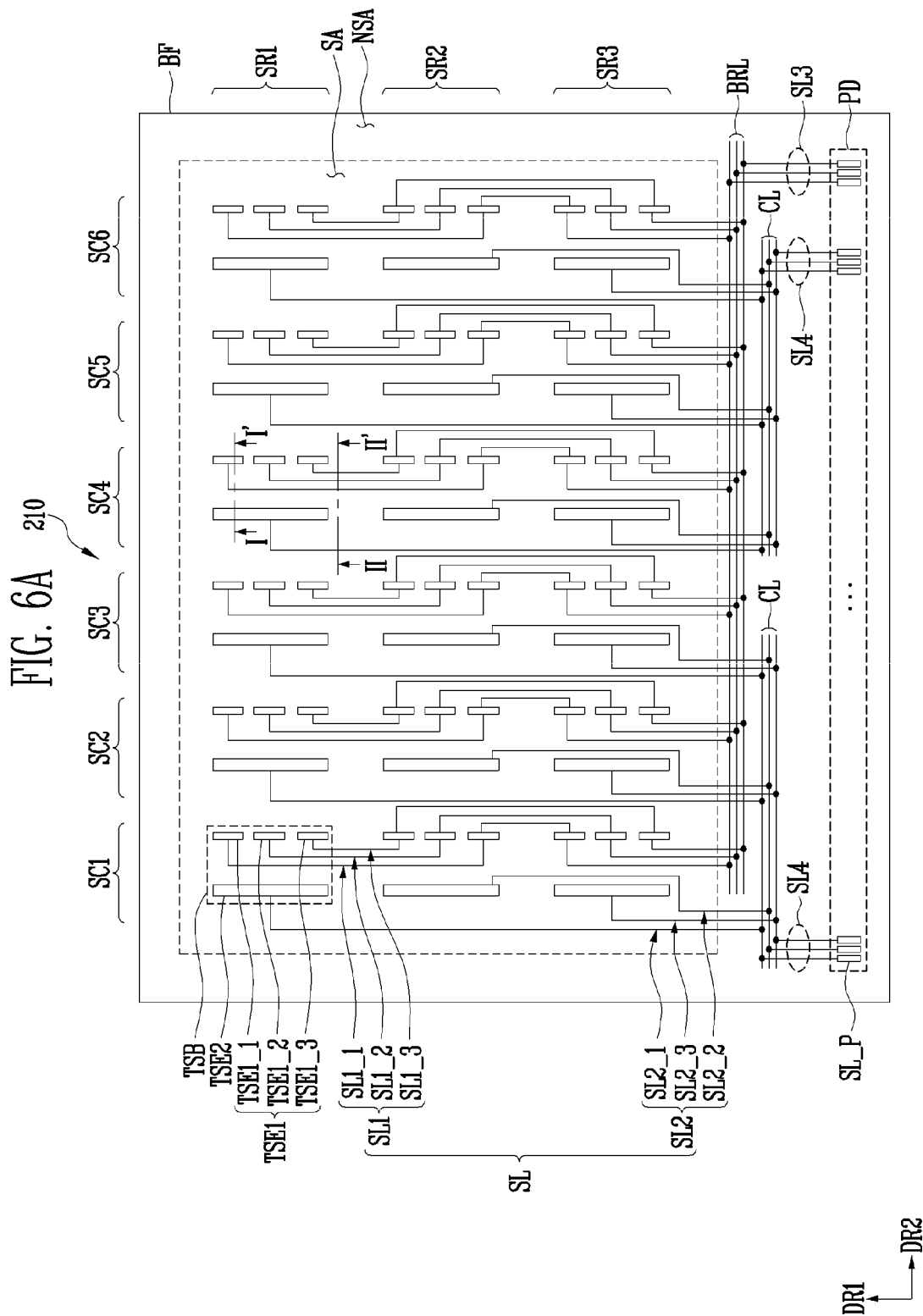

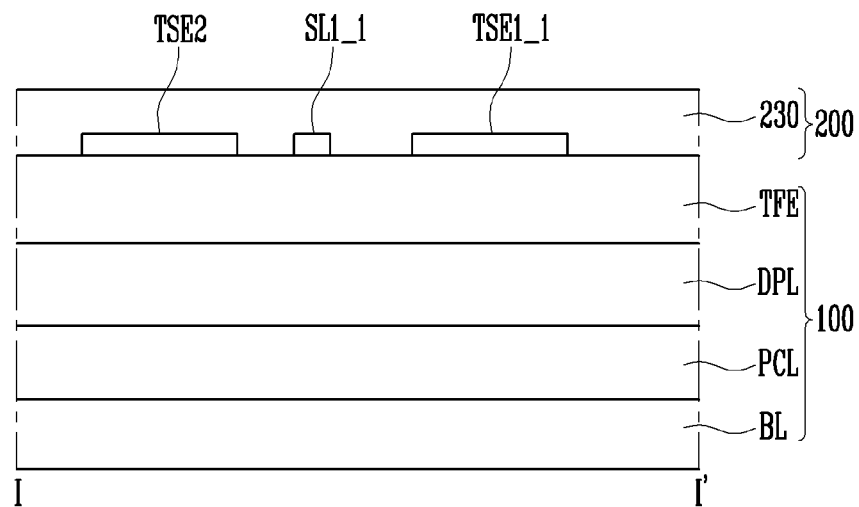
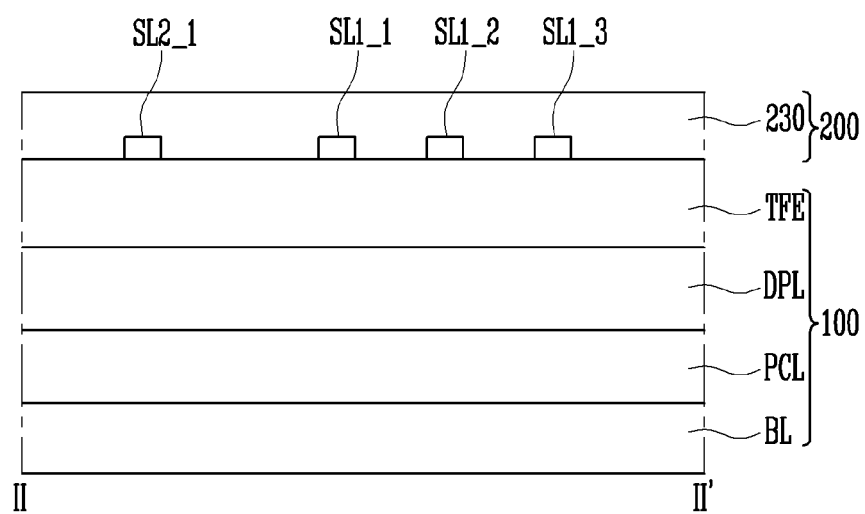

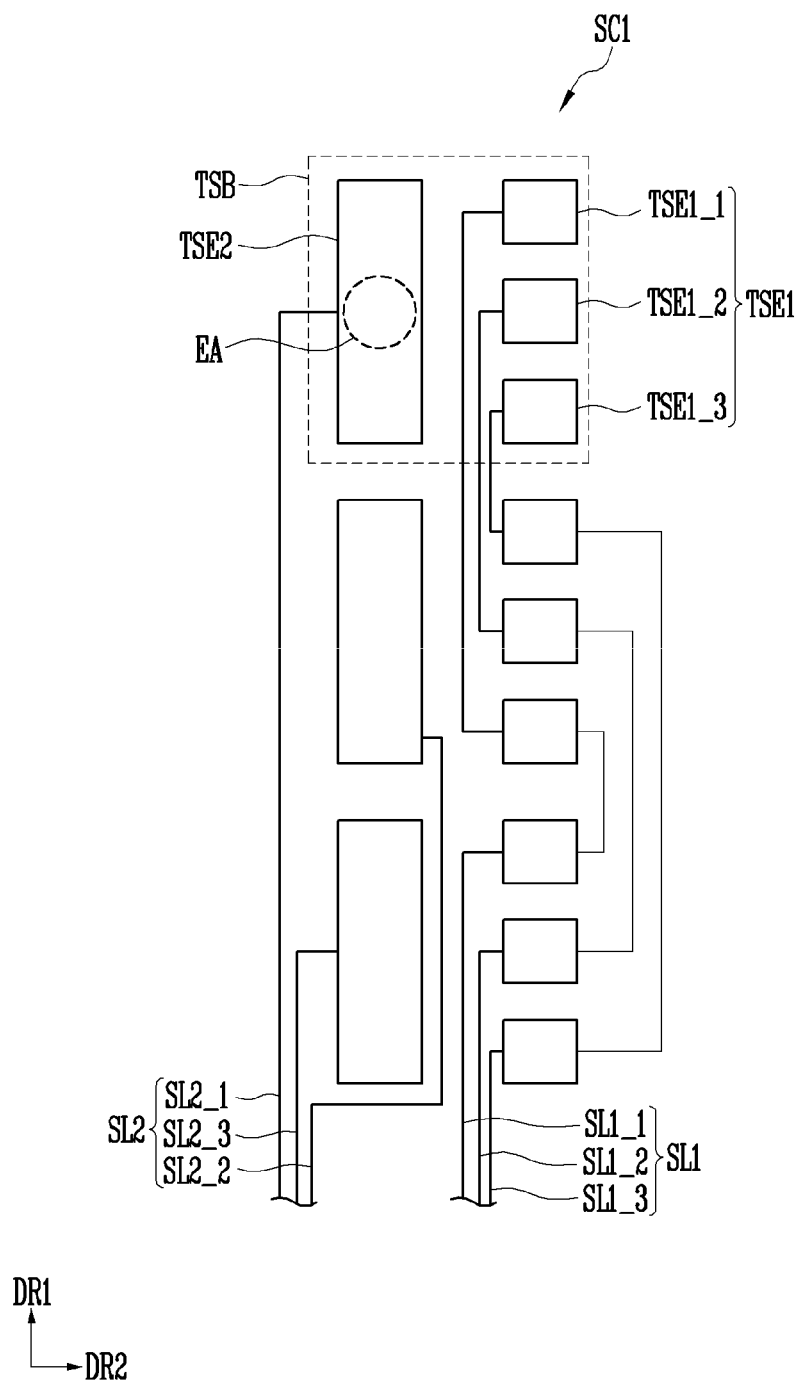

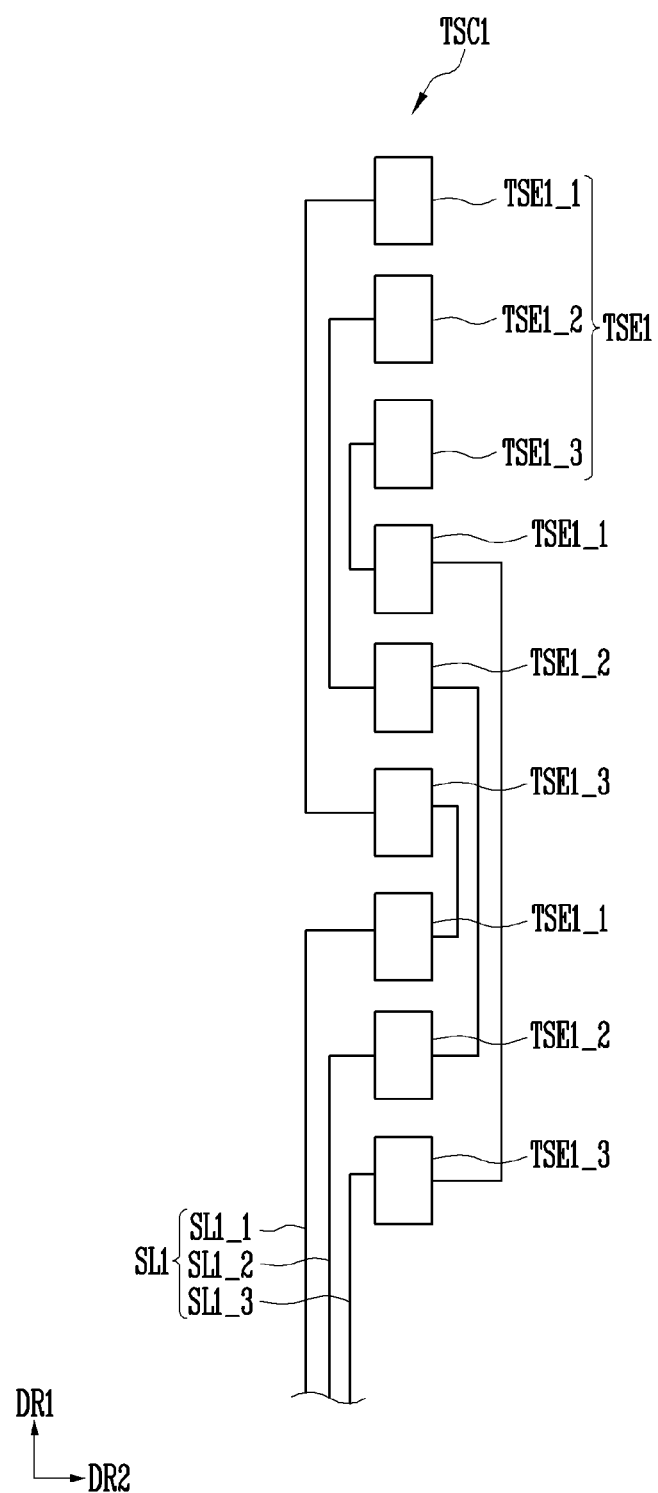

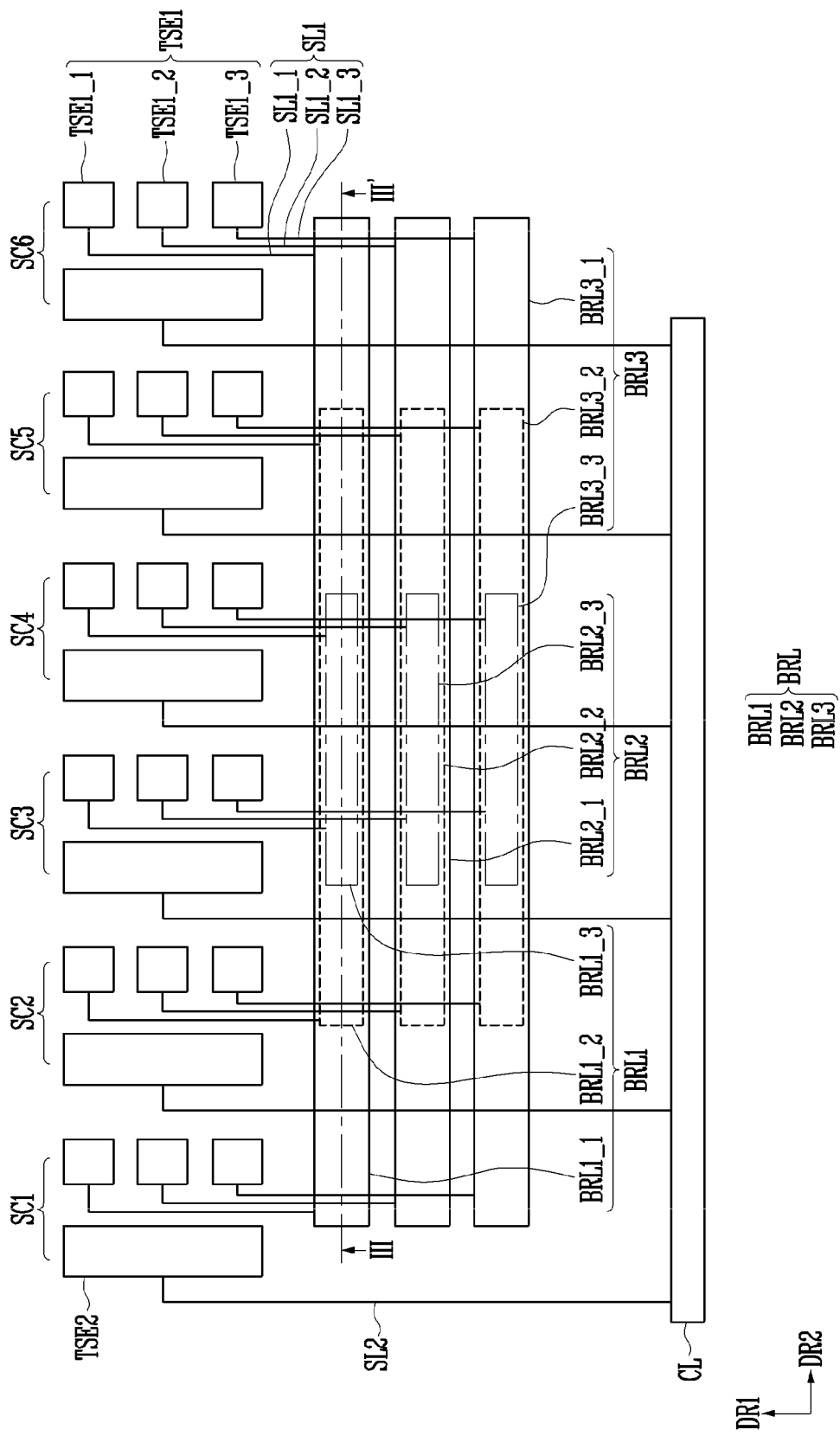

TOUCH SCREEN WITH MINIMAL DEAD SPACE AND DISPLAY DEVICE INCLUDING THE SAME

CROSS-REFERENCE TO RELATED APPLICATION

This application claims priority from and the benefit of Korean Patent Application No. 10-2017-0078766 filed on Jun. 21, 2017, which is hereby incorporated by reference for all purposes as if fully set forth herein.

BACKGROUND

Field

One or more exemplary embodiments relates to a touch screen. More particularly, one or more exemplary embodiments relate to a touch screen in which dead space is minimized and to a display device including the touch screen.

Discussion of the Background

Recent display devices have been developed that not only display images but also accept input information. Specifically, the display device may have a touch screen for inputting a user's touch.

In general, the touch screen includes touch electrodes and sensing lines connected to the touch electrodes, so that a touch event generated in a sensing area may be recognized as an input signal. The touch screen may also include a non-sensing area that includes the sensing lines and that surrounds the sensing area. Multiple sensing lines may be electrically connected to corresponding touch electrodes. Multiple sensing lines in the non-sensing area may cause the non-sensing area to be large, thereby creating a large total dead space of the display device. In addition, increasing the number of touch electrodes and corresponding sensing lines to increase the touch resolution may cause the number of sensing lines in the non-sensing area to increase thereby increasing the side of the total dead space of the display device.

The above information disclosed in this Background section is only for enhancement of understanding of the background of the inventive concepts, and, therefore, it may contain information that does not form the prior art that is already known in this country to a person of ordinary skill in the art.

SUMMARY

One or more exemplary embodiments provide a touch screen in which dead space is minimized.

In addition, one or more exemplary embodiments provide a display device including the touch screen.

Additional aspects will be set forth in the detailed description which follows, and, in part, will be apparent from the disclosure, or may be learned by practice of the inventive concepts.

An exemplary embodiment includes a touch screen. The touch screen includes a base film including a sensing area and a non-sensing area; a plurality of first touch sensor columns including a plurality of first touch electrodes including a plurality of sub-touch electrodes disposed in the sensing area and extended in one direction; a plurality of second touch sensor columns that include a plurality of second touch electrodes disposed in the sensing area and are disposed alternately with the plurality of first touch sensor columns; a first sensing line disposed in the non-sensing area and connected to each sub-touch electrode of the plurality of sub-touch electrodes; a second sensing line disposed in the non-sensing area and connected to each second touch electrode of the plurality of second touch electrodes; a pad disposed in the non-sensing area and electrically connected to the first sensing line and the second sensing line; and a bridge line disposed in the non-sensing area and connecting to the first sensing line. The bridge line includes a multilayer structure in which at least two sub-bridge lines are stacked to overlap each other in a plan view.

An exemplary embodiment includes display device. The display device includes a display panel and a touch screen disposed on at least one side of the display panel. The touch screen includes a base film including a sensing area and a non-sensing area; a plurality of first touch sensor columns including a plurality of first touch electrodes including a plurality of sub-touch electrodes disposed in the sensing area and extended in one direction; a plurality of second touch sensor columns including a plurality of second touch electrodes disposed in the sensing area and are disposed alternately with the plurality of first touch sensor columns; a first sensing line disposed in the non-sensing area and connected to each sub-touch electrode of the plurality of sub-touch electrodes; a second sensing line disposed in the non-sensing area and connected to each second touch electrode of the plurality of second touch electrodes; a pad disposed in the non-sensing area and electrically connected to the first sensing line and the second sensing line; and a bridge line disposed in the non-sensing area and connected to the first sensing line. The bridge line includes a multilayer structure in which at least two sub-bridge lines are stacked to overlap each other in a plan view.

According to one or more exemplary embodiments, a touch screen in which dead space is minimized and a display device including the same may be provided.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

FIG. 6A is a plan view for illustrating a touch sensor layer shown in FIG. 2.

FIG. 7A is a cross-sectional view taken along a line I-I' of FIG. 6A.

FIG. 7B is a cross-sectional view taken along a line II-II' of FIG. 6A.

FIG. 8A is a plan view for illustrating a first sensor column shown in FIG. 6A.

FIG. 9A is a plan view for illustrating a first touch sensor column according to an exemplary embodiment.

FIG. 10B is a plan view for illustrating a connection relationship between a sensor column, a bridge line, a contact line, and a sensing line shown in FIG. 6B.

DETAILED DESCRIPTION OF THE ILLUSTRATED EMBODIMENTS

Figure 1:
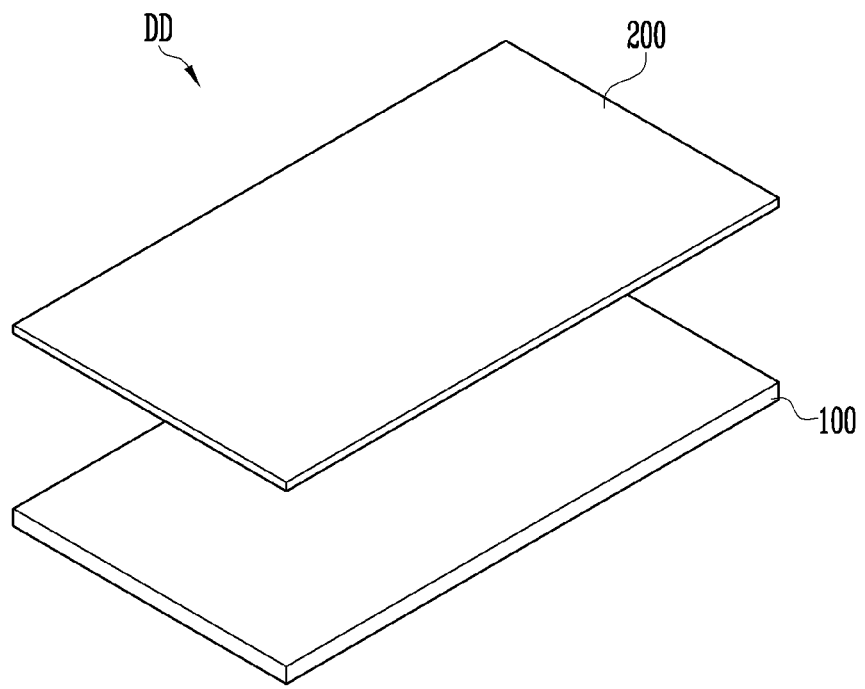
FIG. 1 is an exploded perspective view for illustrating a display device including a touch screen according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms "first," "second," etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. As such, the regions illustrated in the drawings are schematic in nature and their shapes are not necessarily intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Hereinafter, exemplary embodiments will be described in further detail with reference to the accompanying drawings.

Figure 2:
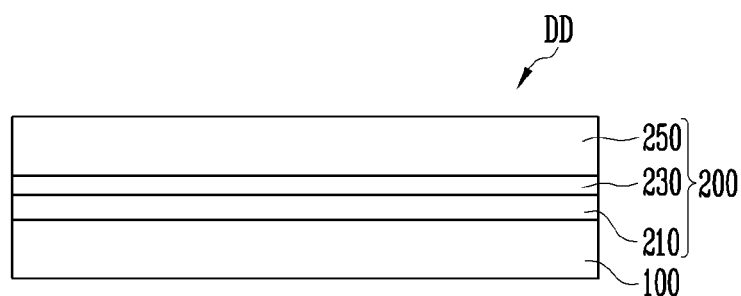
FIG. 2 is a schematic cross-sectional view of a display device shown in FIG. 1.
Figure 3:
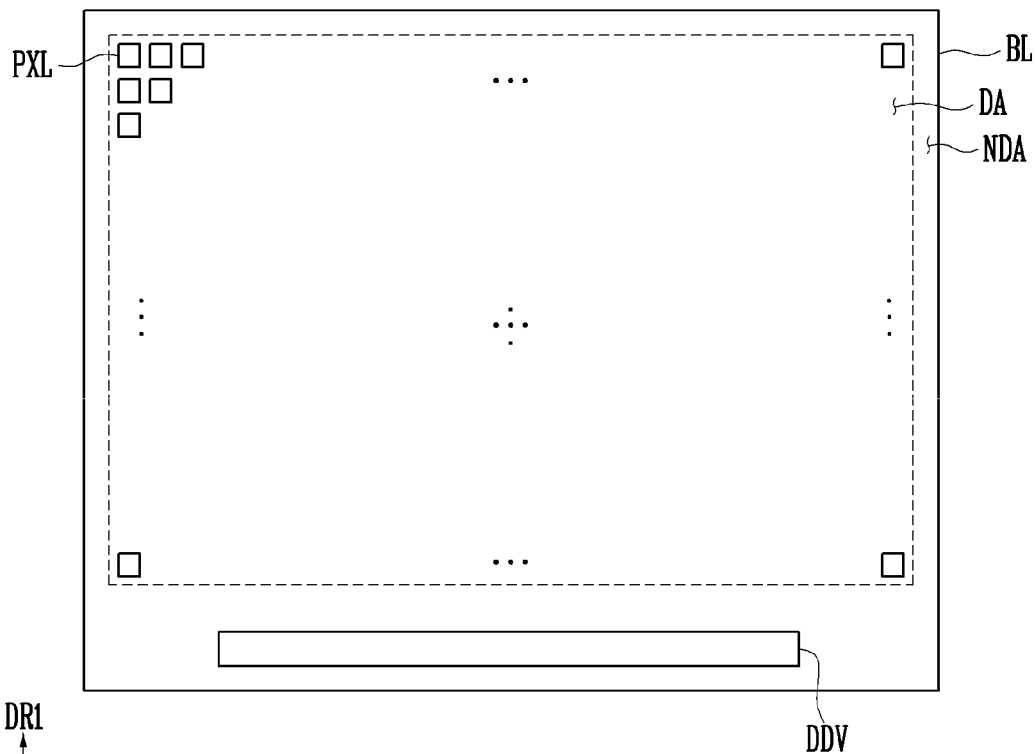
FIG. 3 is a plan view for illustrating a display panel shown in FIG. 1.

FIG. 1 is an exploded perspective view for illustrating a display device including a touch screen according to an exemplary embodiment. FIG. 2 is a schematic cross-sectional view of a display device shown in FIG. 1. FIG. 3 is a plan view for illustrating a display panel shown in FIG. 1.

Referring to FIGS. 1 to 3, a display device DD may include a display panel 100 and a touch screen 200.

The display panel 100 may display an image. The display panel 100 is not particularly limited. For example, a self-luminous display panel such as an organic light emitting display panel (OLED panel) may be used as the display panel 100. In addition, a non-luminous display panel such as a liquid crystal display panel (LCD panel), an electrophoretic display panel (EPD panel), and an electro-wetting display panel (EWD panel) may be used as the display panel 100. When the non-luminous display panel is used as the display panel 100, the display device DD may include a back-light unit for supplying light to the display panel 100. For ease of reference, but by no means limiting, display panel 100 will be described as being an organic light emitting display panel.

The display panel 100 may include base layer BL including a display area DA and non-display area NDA.

A plurality of pixels PXL may be provided in the display area DA of the base layer BL. Each pixel PXL may be one of a red pixel, a green pixel, a blue pixel, or a white pixel, but exemplary embodiments are not limited thereto. For example, the pixel may be one of a magenta pixel, a cyan pixel, or a yellow pixel.

The non-display area NDA of the base layer BL may be disposed on at least one side of the display area DA and may be disposed along the periphery of the display area DA. A pad for providing pads of lines and a data driver DDV for providing a data signal to the pixels PXL may be provided in the non-display area NDA. The data driver DDV may transmit the data signal to each of the pixels PXL through data lines. Herein, the data driver DDV may be disposed on the horizontal portion of the non-display area NDA and may extend in the first direction DR1 of the non-display area NDA.

In FIG. 3, a scan driver, an emission driver, and a timing controller are not shown for convenience of description, but the scan driver, the emission driver, and the timing controller may be also provided in the non-display area NDA.

The base layer BL may be made of a flexible insulating material. The base layer BL may have substantially the same shape corresponding to the shape of the touch screen 200. The base layer BL may have the same area as the touch screen 200 or may have a larger area than the touch screen 200.

The touch screen 200 may be disposed on a surface of the display panel 100. For example, the touch screen 200 may be disposed on an upper surface of the display panel 100 in a direction in which an image is emitted, so as to receive a user's touch input. Alternatively, the touch screen 200 may be formed integrally with the display panel 100. The case where the touch screen 200 is provided on the upper surface of the display panel 100 will be described below for ease of reference only and as an example implementation of various exemplary embodiments.

The touch screen 200 may include a touch sensor layer 210 disposed on one side of the display panel 100 and an insulating layer 230 disposed on the touch sensor layer 210.

The touch sensor layer 210 may recognize a touch event transferred to the display device DD through a user's hand or a separate input means. The touch sensor layer 210 may be a mutual-capacitance type. A mutual-capacitance type touch sensor layer senses a change in capacitance due to an interaction between two touch sensing electrodes. In addition, the touch sensor layer 210 may be a self-capacitance type. A self-capacitance type touch sensor layer senses a change in capacitance of a sensing electrode of a touched region when a user touches the sensing electrode, by using sensing electrodes arranged in a matrix form and sensing lines respectively connected to the sensing electrodes.

The touch sensor layer 210 may include a touch electrode, a sensing line connected to the touch electrode, and a pad connected to one end of the sensing line. The touch sensor layer 210 will be described later.

The insulating layer 230 covers the touch sensor layer 210 and protects the touch sensor layer 210 from the outside. According to an exemplary embodiment, the insulating layer 230 includes an elastic material, thereby being deformed by the touch pressure of the user. In this case, the touch sensor layer 210 may further include a pressure electrode which forms a capacitor together with the touch electrode.

The touch screen 200 may further include a window 250 disposed on the insulating layer 230.

The window 250 may be made of a transparent material. The window 250 may protect an exposed surface of the touch screen 200. The window 250 transmits an image from the display panel 100 and alleviates an external impact, thereby preventing the display panel 100 from being broken or malfunctioning due to the external impact. The external impact may mean a force that causes a defect in the display panel 100 via an external force which may be expressed by pressure, stress, or the like. The window 250 may be entirely or at least partially flexible.

Figure 4:
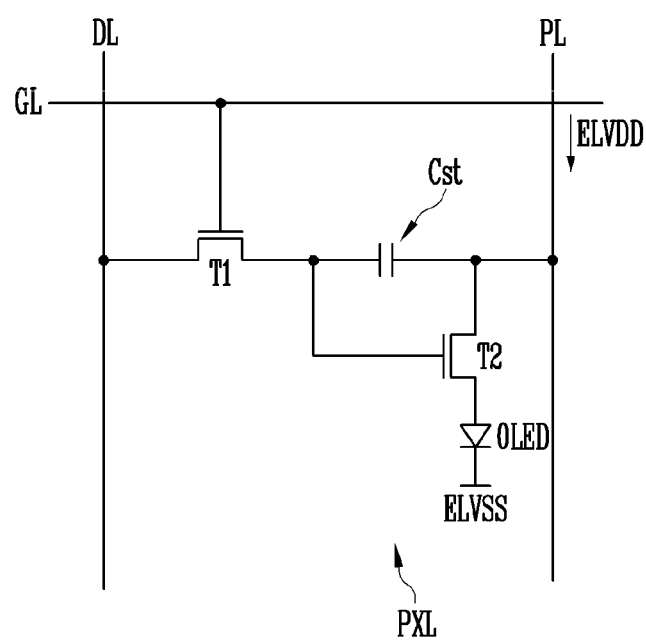
FIG. 4 is an equivalent circuit diagram illustrating one of the pixels shown in FIG. 3.

FIG. 4 is an equivalent circuit diagram illustrating one of pixels shown in FIG. 3. In FIG. 4, for convenience of description, one pixel and lines connected to the pixel are mainly shown.

Referring to FIGS. 3 and 4, each pixel PXL may include a transistor connected to lines, a light emitting element OLED connected to the transistor, and a capacitor Cst. The light emitting element OLED may be a top-emission type organic light emitting element or a bottom-emission type organic light emitting element. The organic light emitting element may be an organic light emitting diode.

Each pixel PXL may include a pixel driving circuit for driving the light emitting element OLED. The pixel driving circuit may include a first transistor T1 (or a switching transistor), a second transistor T2 (or a driving transistor), and the capacitor Cst. A first power supply voltage ELVDD may be provided to the second transistor T2 through a power line PL and a second power supply voltage ELVSS may be provided to the light emitting element OLED. The second power supply voltage EVLSS may be set to a voltage lower than the first power supply voltage ELVDD.

The first transistor T1 outputs a data signal applied to a data line DL in response to a scan signal applied to a gate line GL. The capacitor Cst charges a voltage corresponding to the data signal received from the first transistor T1. The second transistor T2 is connected to the light emitting element OLED. The second transistor T2 controls a driving current flowing to the light emitting element OLED according to the amount of charge stored in the capacitor Cst.

In an exemplary embodiment, one pixel PXL includes two transistors T1 and T2. However, the exemplary embodiment is not limited thereto, and one pixel PXL may include one transistor and one capacitor, or may include three or more transistors and two or more capacitors. For example, one pixel PXL may include seven transistors, the light emitting element OLED, and the capacitor Cst.

Figure 5:
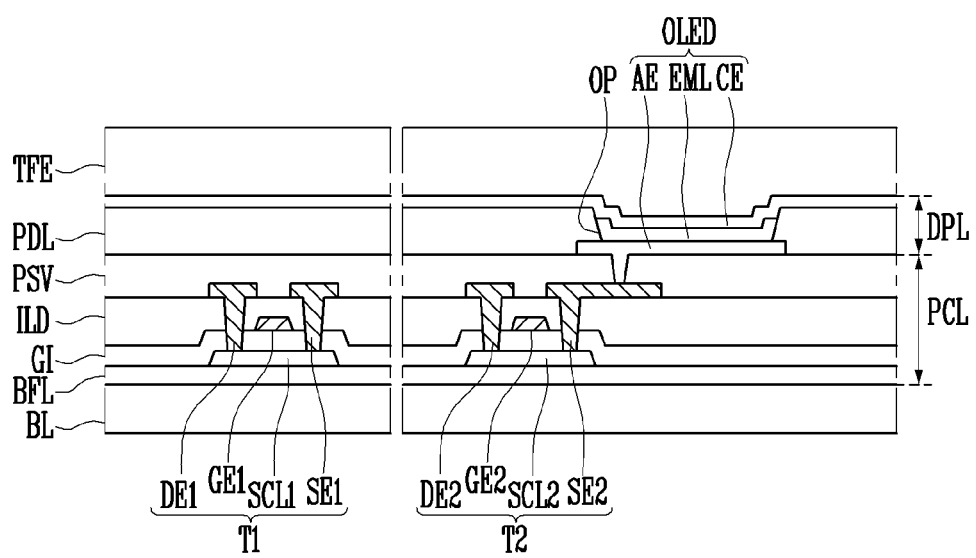
FIG. 5 is a cross-sectional view illustrating a portion of a display device according to an exemplary embodiment.

FIG. 5 is a cross-sectional view illustrating a portion of a display device according to an exemplary embodiment. In FIG. 5, the first transistor and the second transistor provided in each pixel and the light emitting device connected to the transistor are mainly shown for convenience of description.

Referring to FIG. 5, a display device according to an exemplary embodiment may include a base layer BL, a pixel circuit unit PCL, a display element layer DPL, and thin film encapsulation film TFE.

The base layer BL may be formed of an insulating material such as glass, resin, and the like. In addition, the base layer BL may be made of a flexible material so as to be bent or folded, and may have a single-layer structure or a multi-layer structure.

For example, the base layer BL may be made of at least one material selected from the group consisting of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate. However, a material constituting the base layer BL may be variously changed, and the base layer BL may be made of glass fiber reinforced plastic (FRP) or the like. In an exemplary embodiment, the base layer BL may be made of a material having flexibility.

The pixel circuit unit PCL may include a buffer layer BFL disposed on the base layer BL and first and second transistors T1 and T2 disposed on the buffer layer BFL.

The buffer layer BFL may prevent an impurity from diffusing into the first and second transistors T1 and T2. The buffer layer BFL may be provided as a single layer, but may be provided as multiple layers of at least two layers. When the buffer layer BFL is provided as multiple layers, each layer may be formed of the same material or may be formed of different material. The buffer layer BFL may be omitted according to the material of the base layer BL and a process condition.

The first transistor T1 may be a switching transistor for switching the second transistor T2. The second transistor T2 may be a driving transistor electrically connected to the light emitting element OLED of the display element layer DPL to drive the light emitting element OLED.

The first transistor T1 may include a first semiconductor layer SCL1, a first gate electrode GE1, a first source electrode SE1, and a first drain electrode DE1. The second transistor T2 may include a second semiconductor layer SCL2, a second gate electrode GE2, a second source electrode SE2, and a second drain electrode DE2.

The first and second semiconductor layers SCL1 and SCL2 may be disposed on the buffer layer BFL. Each of the first and second semiconductor layers SCL1 and SCL2 may include a source region and a drain region which contact the first and second source electrodes SE1 and SE2 and the first and second drain electrodes DE1 and DE2, respectively. The region between the source region and the drain region may be a channel region. The first and second semiconductor layers SCL1 and SCL2 may be a semiconductor pattern made of polysilicon, amorphous silicon, oxide semiconductor, or the like. The channel region may be a semiconductor pattern which is not doped with an impurity, and may be an intrinsic semiconductor. The source region and the drain region may be a semiconductor pattern doped with the impurity. An n-type impurity, a p-type impurity, and other impurity such as metals may be used as the impurity.

The first and second gate electrodes GE1 and GE2 may be respectively disposed on the first and second semiconductor layers SCL1 and SCL2 with a gate insulating layer G1 interposed therebetween. Herein, the gate insulating layer G1 may be an inorganic insulating layer including an inorganic material. For example, the inorganic insulating layer may include silicon nitride, silicon oxide, silicon oxynitride, or the like.

The first source electrode SE1 and the first drain electrode DE1 may be respectively connected to the source region and the drain region of the first semiconductor layer SCL1 through a contact hole passing through an interlayer insulating layer ILD and the gate insulating layer G1. The second source electrode SE2 and the second drain electrode DE2 may be respectively connected to the source region and the drain region of the second semiconductor layer SCL2 through a contact hole passing through the interlayer insulating layer ILD and the gate insulating layer G1. The interlayer insulating layer ILD may be an inorganic insulating layer made of an inorganic material or an organic insulating layer made of an organic material.

The pixel circuit unit PCL may further include a passivation layer PSV disposed on the first and second transistors T1 and T2 to cover the first and second transistors T1 and T2.

The display element layer DPL may include a light emitting element OLED disposed on the passivation layer PSV. The light emitting element OLED may include first and second electrodes AE and CE, and an emission layer EML provided between the first and second electrodes AE and CE. Herein, one of the first and second electrodes AE and CE may be an anode electrode and the other of the first and second electrodes AE and CE may be a cathode electrode. For example, the first electrode AE may be the anode electrode and the second electrode CE may be the cathode electrode. When the light emitting element OLED is a top emission type organic light emitting element, the first electrode AE may be a reflective electrode and the second electrode CE may be a transmissive electrode. In an exemplary embodiment, the case where the light emitting element OLED is a top emission type organic light emitting element and the first electrode AE is an anode electrode will be described as an example.

The first electrode AE may be connected to the second source electrode SE2 of the second transistor T2 through a contact hole passing through the passivation layer PSV. The first electrode AE may include a reflective layer (not shown) capable of reflecting light and a transparent conductive layer (not shown) disposed at the upper portion or the lower portion of the reflective layer. At least one of the transparent conductive layer and the reflective layer may be connected to the second source electrode SE2.

The display element layer DPL may further include a pixel definition layer PDL having an opening OP for exposing a portion of the first electrode AE, for example, an upper surface of the first electrode AE.

The pixel definition layer PDL may include an organic insulating material. For example, the pixel definition layer PDL may be made of at least one material selected from the group consisting of polystyrene, polymethylmethacrylate (PMMA), polyacrylonitrile (PAN), polyamide (PA), polyimide (PI), polyarylether (PAE), heterocyclic polymer, parylene, epoxy, benzocyclobutene (BCB), siloxane based resin, and silane based resin.

The emission layer EML may be disposed on the exposed surface of the first electrode AE.

The emission layer EML may include a low-molecular material or a high-molecular material. In an exemplary embodiment, the low-molecular material may include copper phthalocyanine (CuPc), N,N'-Di(naphthalene-1-yl)-N, N'-diphenyl-benzidine (NPB), tris-8-hydroxyquinoline aluminum (Alq3), or the like. The high-molecular material may include PEDOT, poly-phenylenevinylene (PPV) and poly-fluorene, or the like.

The emission layer EML may be provided as a single layer, but may be provided as multiple layers including various function layers. When the emission layer EML is provided as multiple layers, the emission layer EML may have the structure in which a hole injection layer, a hole transport layer, an light emitting layer, an electron transport layer, an electron injection layer, and the like are stacked in a single or a multiple structure. Of course, the emission layer EML is not necessarily limited thereto, and may have various structures. At least a portion of the emission layer EML may be integrally formed over a plurality of first electrodes AE, and may be individually formed corresponding to each of the plurality of first electrodes AE. The color of light emitted from the emission layer EML may be one of red, green, blue, and white, but the exemplary embodiment is not limited thereto. For example, the color of light emitted from the light generating layer of the emission layer EML may be one of magenta, cyan, and yellow.

The second electrode CE may be disposed on the emission layer EML. The second electrode CE may be a transflective layer. For example, the second electrode CE may be a thin metal layer having a thickness enough to transmit light emitted from the emission layer EML. The second electrode CE may transmit a portion of light emitted from the emission layer EML and may reflect the other portion of light emitted from the emission layer EML.

The thin film encapsulation film TFE may be disposed on the light emitting element OLED.

The thin film encapsulation film TFE may be made of a single layer or multiple layers. The thin film encapsulation film TFE may include a plurality of insulating layers covering the light emitting element OLED. Specifically, the thin film encapsulation film TFE may include a plurality of inorganic layers and a plurality of organic layers. For example, the thin film encapsulation film TFE may have a structure in which the inorganic layer and the organic layer are alternately stacked. In addition, the thin film encapsulation film TFE may be an encapsulation substrate disposed on the organic light emitting element and adhered to the base layer BL by using a sealant.

Figure 6B:
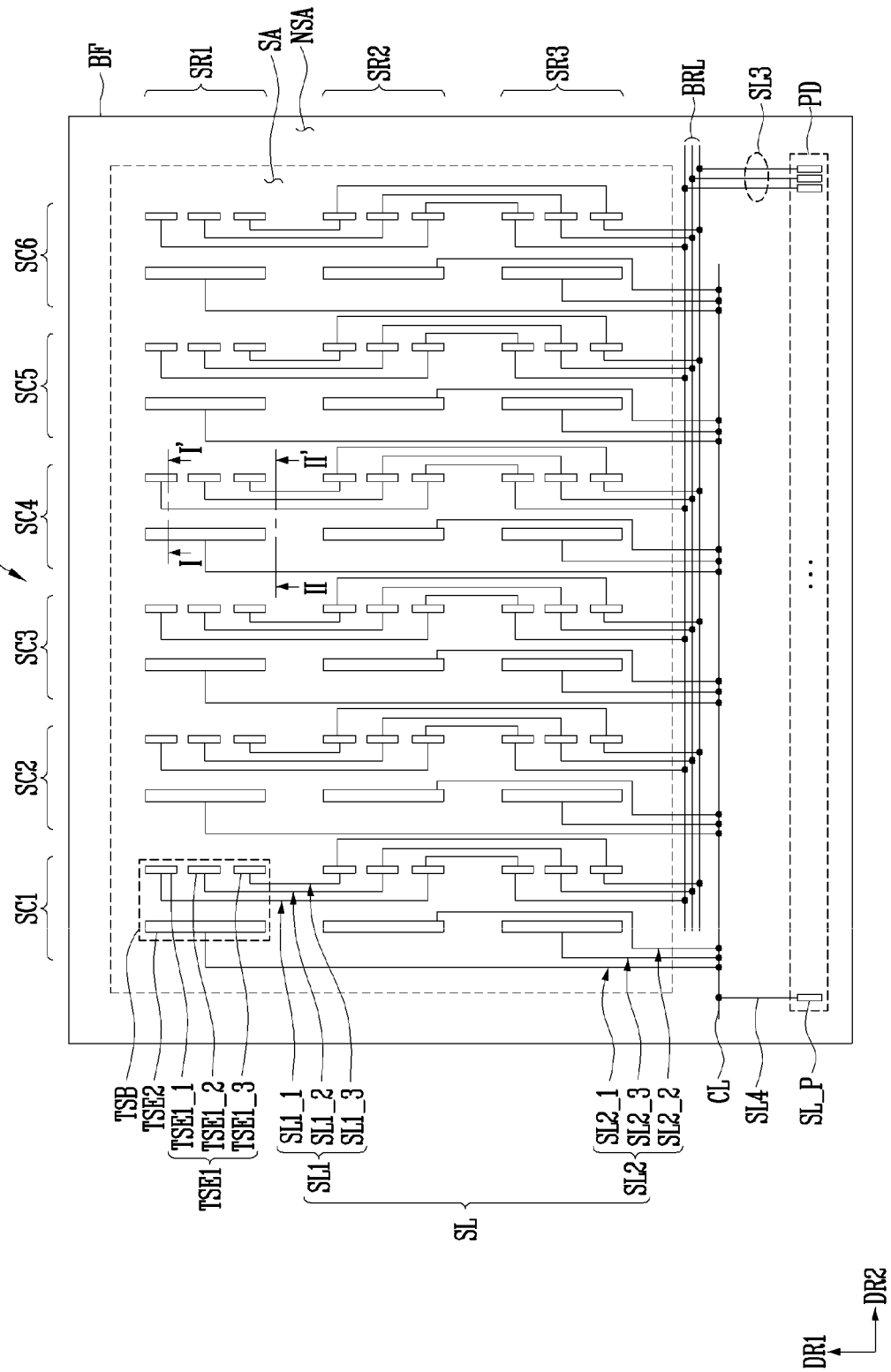
FIG. 6B is a plan view for illustrating a touch sensor layer according to another exemplary embodiment.
Figure 8B:
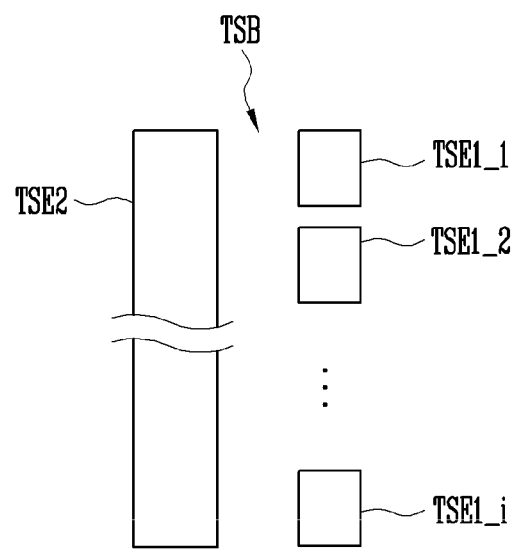
FIG. 8B is a plan view for illustrating a touch sensor block shown in FIG. 8A.
Figure 8C:
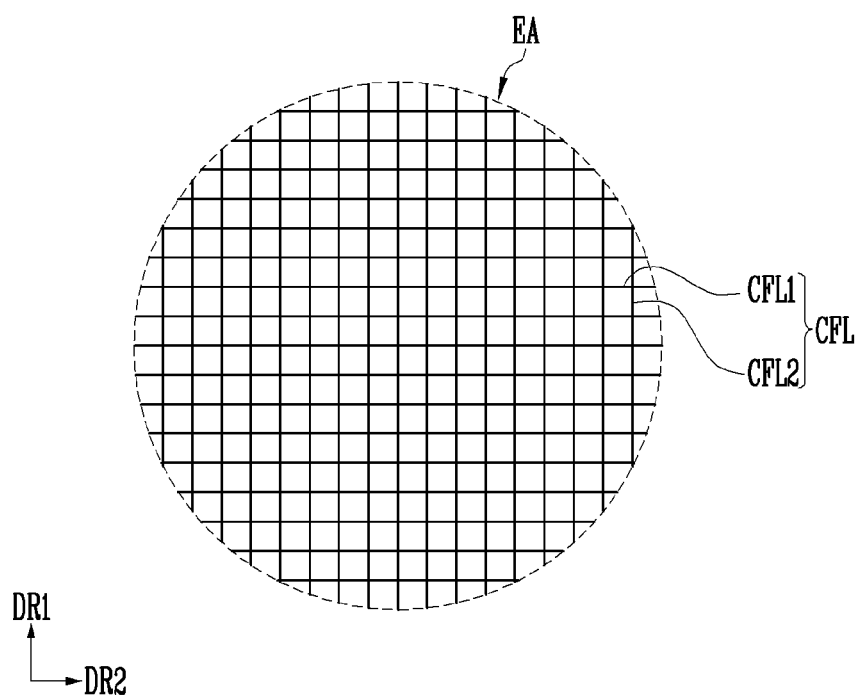
FIG. 8C is an enlarged view of an EA region of FIG. 8A.
Figure 9B:
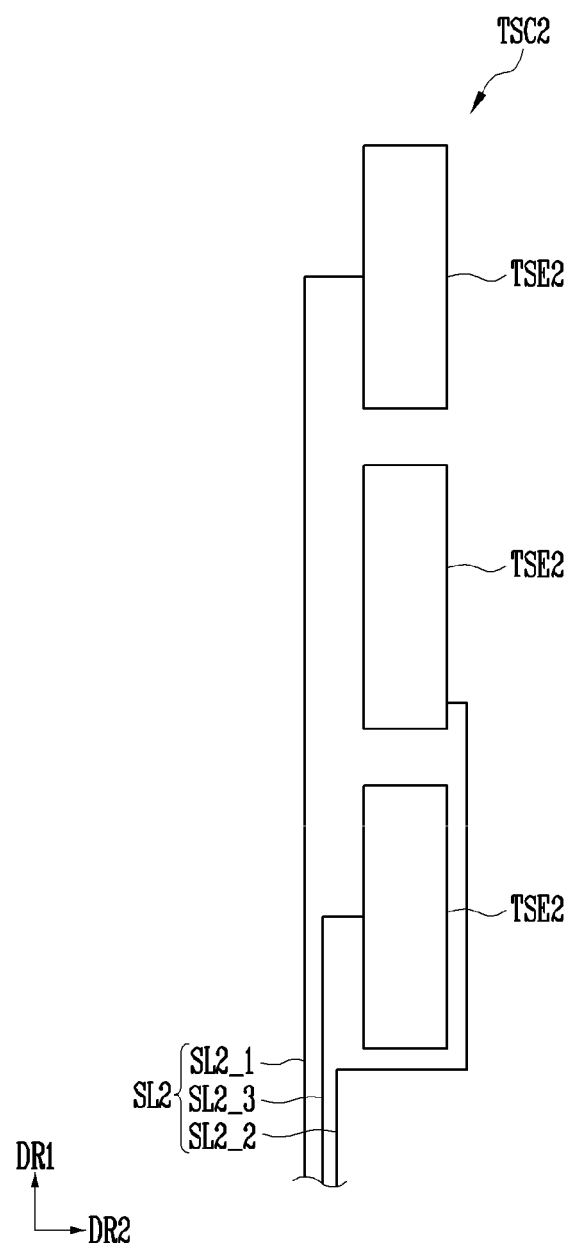
FIG. 9B is a plan view for illustrating a second touch sensor column according to an exemplary embodiment.

FIG. 6A is a plan view for illustrating a touch sensor layer shown in FIG. 2. FIG. 6B is a plan view for illustrating a touch sensor layer according to another exemplary embodiment. FIG. 7A is a cross-sectional view taken along line I-I' of FIG. 6A. FIG. 7B is a cross-sectional view taken along line II-II' of FIG. 6A. FIG. 8A is a plan view for illustrating a first sensor column shown in FIG. 6A. FIG. 8B is a plan view for illustrating a touch sensor block shown in FIG. 8A. FIG. 8C is an enlarged view of an EA region of FIG. 8A. FIG. 9A is a plan view for illustrating a first touch sensor column according to an exemplary embodiment. FIG. 9B is a plan view for illustrating a second touch sensor column according to an exemplary embodiment.

Referring to FIGS. 2, 6A, 6B, 7A, 7B, 8A, 8B, 8C, 9A, and 9B, the touch sensor layer 210 may include a base film BF including a sensing area SA and a non-sensing area NSA.

The base film BF may be made of an insulating material having flexibility. The base film BF may be provided in substantially the same shape as the display panel 100. In an exemplary embodiment of the present invention, the base film BF may be an inorganic layer disposed at an outermost of the thin film encapsulation film TFE of the display panel 100.

The sensing area SA may correspond to a display area (see DA in FIG. 3) of the display panel 100 and may be provided in substantially the same shape as the display area DA. The non-sensing area NSA may be disposed adjacent to the sensing area SA. In addition, the non-sensing areas NSA may correspond to a non-display area (see NDA in FIG. 3) of the display panel 100.

A plurality of touch sensor blocks TSB may be disposed in the sensing area SA, and a plurality of sensing lines SL and a pad PD may be disposed in the non-sensing area NSA.

The touch sensor blocks TSB may define a plurality of sensor columns SC1 to SC6 or may define a plurality of sensor rows SR1 to SR3. Each of the plurality of sensor columns SC1 to SC6 may include a plurality of touch sensor blocks TSB arranged in a first direction DR1 (i.e., column direction). The plurality of sensor columns SC1 to SC6 may be arranged in a second direction DR2 (i.e., row direction). The plurality of touch sensor blocks TSB arranged in a matrix form is shown in FIGS. 6A and 6B, but embodiments are not limited thereto.

Each of the plurality of sensor columns SC1 to SC6 may include a first touch sensor column TSC1 including a plurality of first touch electrode TSE1 arranged in the first direction DR1, and a second touch sensor column TSC2 including a plurality of second touch electrode TSE2 arranged in the first direction DR1. The first touch sensor column TSC1 and the second touch sensor column TSC2 may be alternately disposed in the sensing area SA.

Each of first touch electrodes TSE1 may include a plurality of first sub-touch electrodes, for example, i (herein, i is a natural number greater than or equal to 2) first sub-touch electrodes TSE1_1, TSE1_2, and TSE1_3 spaced apart from each other.

For example, one first touch electrode TSE1 may include three first sub-touch electrodes TSE1_1, TSE1_2, and TSE1_3. The three first sub-touch electrodes TSE1_1, TSE1_2, TSE1_3 may include the 1-1-th sub-touch electrode TSE1_1, the 1-2-th sub-touch electrode TSE1_2, and the 1-3-th sub-touch electrode TSE1_3. In this case, the 1-1-th to 1-3-th sub-touch electrodes TSE1_1, TSE1_2 and TSE1_3 may be sequentially disposed in the extending direction of the first touch sensor column TSC1. That is, the 1-1-th sub-touch electrode TSE1_1 of the 1-1-th to 1-3-th sub-touch electrodes TSE1_1, TSE1_2, and TSE1_3 may be disposed farthest from the pad PD, and the 1-3-th sub-touch electrode TSE1_3 may be disposed closest to the pad PD.

The 1-1-th to 1-3-th sub-touch electrodes TSE1_1, TSE1_2 and TSE1_3 may be connected to the first sensing lines SL1. The first sensing lines SL1 may be disposed between the first touch sensor column TSC1 and the second touch sensor column TSC2. One 1-1-th to 1-3-th sub-touch electrodes TSE1_1, TSE1_2, and TSE1_3 may be respectively connected to another corresponding 1-1-th to 1-3-th sub-touch electrodes TSE1_1, TSE1_2, and TSE1_3 of the first touch electrode TSE1 adjacent to each other in the same first touch sensor column TSC1 through the first sensing lines SL1.

When a single first touch electrode TSE1 includes i first sub-touch electrodes TSE1_1, TSE1_2 and TSE1_3, the 1-j-th (herein, j is a natural number less than or equal to i) sub-touch electrode of the single first touch electrode TSE1 may be connected to the 1-i-j+1-th sub-touch electrode of the first touch electrode TSE1 adjacent to each other through the j-th first sensing line SL1. Therefore, when the number of the first sub-touch electrodes TSE1_1, TSE1_2, and TSE1_3 provided in the first touch electrode TSE1 is i, the number of the first sensing lines SL1 corresponding to one first touch sensor column TSC1 may be i. One the first sensing lines SL1 may include a 1-1-th sensing line SL1_1, a 1-2-th sensing line SL1_2, and a 1-3-th sensing line SL1_3.

For example, when one first touch electrode TSE1 includes three first sub-touch electrodes TSE1_1, TSE1_2, and TSE1_3, the 1-1-th sub-touch electrode TSE1_1 of the one first touch electrode TSE1 may be connected to the 1-3-th sub-touch electrode TSE_3 of another first touch electrode TSE1 adjacent to the one first touch electrode TSE1 through the 1-1-th sensing line SL1_1. In addition, the 1-2-th sub-touch electrode TSE1_2 of the one first touch electrode TSE1 may be connected to the 1-2-th sub-touch electrode TSE1_2 of another first touch electrode TSE1 adjacent to the one first touch electrode TSE1 through the 1-2-th sensing line SL1_2. The 1-3-th sub-touch electrode TSE1_3 of the one first touch electrode TSE1 may be connected to the 1-1-th sub-touch electrode TSE1_1 of another first touch electrode TSE1 adjacent to the one first touch electrode TSE1 through the 1-3-th sensing line SL1_3. Therefore, the number of the first sensing lines SL1 corresponding to one touch sensor column TSC1 may be three.

The 1-1-th to 1-3-th sensing lines SL1_1, SL1_2, and SL1_3 may extend from the sensing area SA to the non-sensing area NSA in the first direction DR1.

The second touch sensor column TSC2 may include q (herein, q is a natural number greater than or equal to 2) second touch electrodes TSE2. The second touch electrodes TSE2 may be disposed in a direction in which the second touch sensor column TSC2 extends. The second touch electrodes TSE2 may be connected to second sensing lines SL2. The number of the second sensing lines SL2 corresponding to the second touch sensor column TSC2 may be the same as the number of the second touch electrodes TSE2. For example, the number of the second sensing lines SL2 corresponding to the second touch sensor column TSC2 may be q. When three second touch electrodes TSE2 are disposed in the second touch sensor column TSC2, the number of the second sensing lines SL2 may be three. Specifically, the second sensing lines SL2 may include a 2-1-th sensing line SL2_1 connected to the second touch electrode TSE2 disposed at the upper side of the second touch sensor column TSC2, a 2-2-th sensing line SL2_2 connected to the second touch electrode TSE2 disposed at the center of the second touch sensor column TSC2, and a 2-3-th sensing line SL2_3 connected to the second touch electrode TSE2 disposed at the lower side of the second touch sensor column TSC2.

One of the first touch electrodes TSE1 and the second touch electrodes TSE2, for example, the first touch electrodes TSE1 may be a touch driving electrode for receiving a touch driving signal, and the other of the first touch electrodes TSE1 and the second touch electrodes TSE2, for example, the second touch electrodes TSE2 may be a touch receiving electrode for outputting a touch sensing signal. The touch sensor layer 210 may sense a user's touch by using a change in capacitance of a capacitor formed between the first touch electrodes TSE1 and the second touch electrodes TSE2.

The first touch electrodes TSE1 and the second touch electrodes TSE2 may sense a change in capacitance due to a touch input of a specific object such as a user's body or a stylus pen. In addition, the first touch electrodes TSE1 and the second touch electrodes TSE2 may include a conductive material so as to sense the change in capacitance.

The first sensing lines SL1 and the second sensing lines SL2 may transfer a change in capacitance sensed by the first touch electrodes TSE1 and the second touch electrodes TSE2 through the pad PD to an external circuit (not shown). In addition, the first sensing lines SL1 and the second sensing lines SL2 may include a conductive material in the same manner as the first touch electrodes TSE1 and the second touch electrodes TSE2.

An insulating layer 230 may be disposed on the first and second sensing lines SL1 and SL2, the first touch electrodes TSE1, and the second touch electrodes TSE2 to cover on the first and second sensing lines SL1 and SL2, the first touch electrodes TSE1, and the second touch electrodes TSE2.

As shown in FIG. 8C, the second touch electrodes TSE2 may include a plurality of conductive fine lines CFL. For example, the second touch electrodes TSE2 may include a plurality of first conductive fine lines CFL1 extending in the second direction DR2 and parallel to each other, and a plurality of second conductive fine lines CFL2 extending in the first direction DR1 crossing the second direction DR2 and parallel to each other. That is, each of the second touch electrodes TSE2 may have a mesh structure. The mesh structure may include a plurality of openings, for example, regions formed by crossing the first conductive fine lines CFL1 and the second conductive fine lines CFL2.

Each of the second touch electrodes TSE2 has a mesh structure in the drawing, but the embodiments are not limited thereto. For example, each of the first sub-touch electrodes TSE1_1, TSE1_2, and TSE1_3 may include the plurality of conductive fine lines CFL.

When the first sub-touch electrodes TSE1_1, TSE1_2, and TSE1_3 and the second touch electrodes TSE2 have a mesh structure, the overlapping area of the first sub-touch electrodes TSE1_1, TSE1_2, and TSE1_3 and the second touch electrodes TSE2, and the display panel 100 may be decreased by the opening. When the overlapping area of the first sub-touch electrodes TSE1_1, TSE1_2, and TSE1_3 and the second touch electrodes TSE2, and the display panel 100 is decreased, electromagnetic interference between the first sub-touch electrodes TSE1_1, TSE1_2, and TSE1_3 and the second touch electrodes TSE2, and the display panel 100 may be prevented. Therefore, the touch sensing sensitivity of the touch sensor layer 210 may be improved.

The first conductive fine lines CFL1 and the second conductive fine lines CFL2 may include at least one selected from the group consisting of aluminum (Al), copper (Cu), chromium (Cr), nickel (Ni), gold (Au), platinum (Pt), and an alloy thereof. In addition, the first conductive fine lines CFL1 and the second conductive fine lines CFL2 may include a transparent conductive oxide. In addition, the first conductive fine lines CFL1 and the second conductive fine lines CFL2 may be provided as multiple layers including two or more conductive layers The first touch electrodes TSE1 and the second touch electrodes TSE2 may be disposed on the display panel 100. Specifically, the first touch electrodes TSE1 and the second touch electrodes TSE2 may be disposed on the thin film encapsulation film TFE of the display panel 100. The first touch electrodes TSE1 and the second touch electrodes TSE2 may be provided at the same layer. In an exemplary embodiment of the present invention, the thin film encapsulation film TFE may be a base film BF. Therefore, the first touch electrodes TSE1 and the second touch electrodes TSE2 may be provided at the same layer on the base film BF.

In addition, the first sensing lines SL1 and the second sensing lines SL2 may be disposed on the display panel 100. Specifically, the first and second sensing lines SL1 and SL2 are disposed on the thin film encapsulation film TFE. The first sensing lines SL1 may be provided at the same layer as the second sensing lines SL2. That is, the first and second sensing lines SL1 and SL2 may be provided at the same layer on the base film BF. The first and second sensing lines SL1 and SL2 may be provided at the same layer as the first touch electrodes TSE1 and the second touch electrodes TSE2.

The pad PD may include a plurality of pads SL_P. The pads SL_P may be electrically connected to the first touch electrodes TSE1 and the second touch electrodes TSE2 through the first sensing lines SL1 and the second sensing lines SL2.

Meanwhile, a bridge line BRL electrically connected to the first sensing lines SL1 and a contact line CL electrically connected to the second sensing lines SL2 may be disposed in the non-sensing area NSA. In addition, a third sensing line SL3 connecting the bridge line BRL and the pad PD and a fourth sensing line SL4 connecting the contact line CL and the pad PD are further disposed in the non-sensing area NSA.

The number of the contact lines CL may be the same as the number of the second touch electrodes TSE2 disposed in the second touch sensor column TSC2. That is, q contact lines CL may be provided. In an exemplary embodiment, three contact lines CL are grouped together.

As shown in FIG. 6A, the contact lines CL may be respectively disposed in one or more groups that are adjacent to each other and at one side of the non-sensing area NSA. For example, the contact lines CL may include a first group of contact lines CL disposed at one side of the non-sensing area NSA and a second group of sub-contact lines CL disposed adjacent to the first group of contact lines CL and disposed at the same side of the non-sensing area NSA. Each contact line of the first group of contact lines CL and the second group of contact lines CL may be electrically connected to a corresponding pad SL_P of the pad PD through the fourth sensing line SL4.

The number of the fourth sensing line SL4 may be the same as the number of the contact lines CL. That is, q fourth sensing lines SL4 may be provided. The q fourth sensing lines SL4 may be connected to corresponding contact lines CL through contact holes.

In FIG. 6A, the contact lines CL are respectively disposed at one side of the non-sensing area NSA in groups that are adjacent to one another, but the embodiments are not limited thereto. According to an exemplary embodiment, the contact line CL may also be provided as single line extending in the second direction DR2 as shown in FIG. 6B. In this case, the contact line CL may be provided as multiple layers in which two or more conductive layers are stacked. For example, the contact line CL may be provided as multiple layers including a first conductive layer, a second conductive layer disposed on the first conductive layer, and a third conductive layer disposed on the second conductive layer. Herein, the first to third conductive layers may be insulated from each other by an insulating layer (not shown).

The first conductive layer may be electrically connected to the second touch electrode TSE2 disposed at the upper side of the sensing area SA among three second touch electrode TSE2 disposed in the second touch sensor column TSC2. The second conductive layer may be electrically connected to the second touch electrode TSE2 disposed at the center of the sensing area SA among three second touch electrode TSE2 disposed in the same second touch sensor column TSC2. The third conductive layer may be electrically connected to the second touch electrode TSE2 disposed at the lower side of the sensing area SA among three second touch electrode TSE2 disposed in the same second touch sensor column TSC2. The first to third conductive layers may be disposed on the non-sensing area NSA so as to overlap each other in a plan view.

When the contact line CL is provided as a single line as shown in FIG. 6B, the fourth sensing line SL4 may also be provided as a single line.

The number of the bridge lines BRL may be the same as the number of the first sub-touch electrodes TSE1_1, TSE1_2, and TSE1_3 disposed in one touch sensor block TSB. That is, i bridge lines BRL may be provided. In an exemplary embodiment, the bridge line BRL may be provided as three bridge lines BRL. The 1-1-th sensing line SL1_1 corresponding to the first touch sensor column TSC1 may be connected to one bridge line BRL of the three bridge lines BRL. The 1-2-th sensing line SL1_2 corresponding to the first touch sensor column TSC1 may be connected to another bridge line BRL of the three bridge lines BRL. In addition, the 1-3-th sensing line SL1_3 corresponding to the first touch sensor column TSC1 may be connected to the other bridge line BRL of the three bridge lines BRL. The plurality of first touch electrodes TSE1 disposed in the first touch sensor column TSC1 may be electrically connected to each other by the bridge line BRL. The bridge line BRL will be described hereinafter.

The number of the third sensing lines SL3 may be the same as the number of the bridge lines BRL. That is, i third sensing lines SL3 may be provided. The i third sensing lines SL3 may be connected to corresponding bridge lines BRL through contact holes.

Figure 10A:
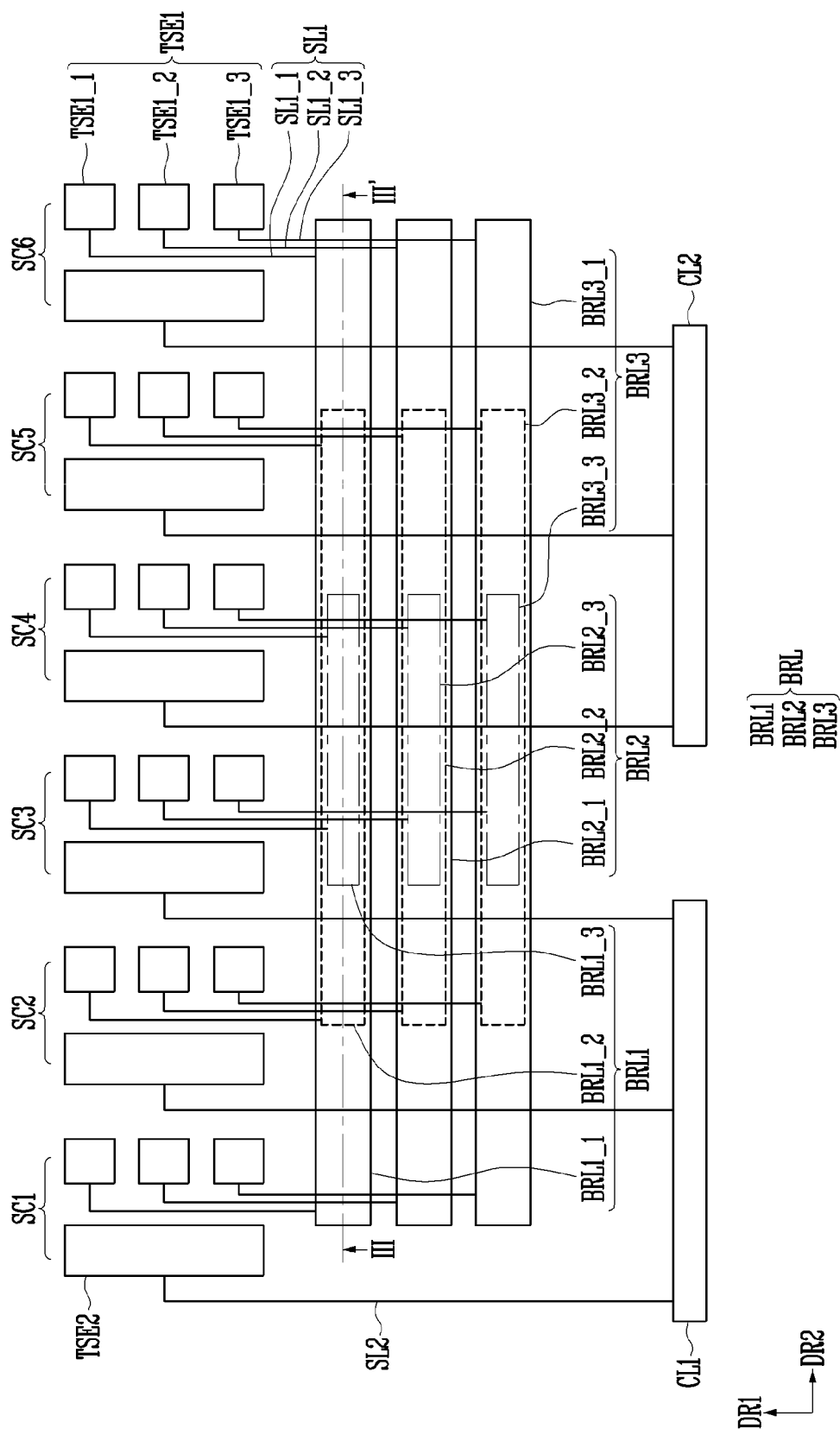
FIG. 10A is a plan view for illustrating a connection relationship between a sensor column, a bridge line, a contact line, and a sensing line shown in FIG. 6A.
Figure 11:
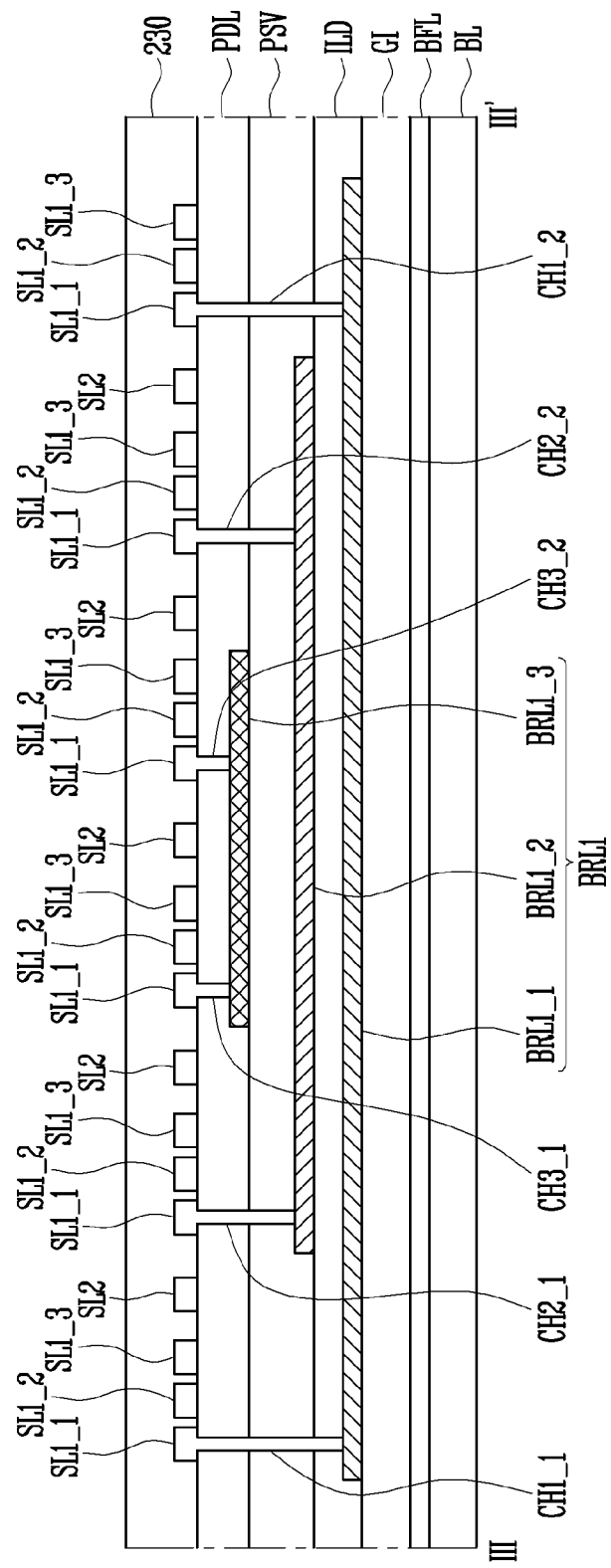
FIG. 11 is a cross-sectional view taken along line of FIG. 10A.
Figure 12:
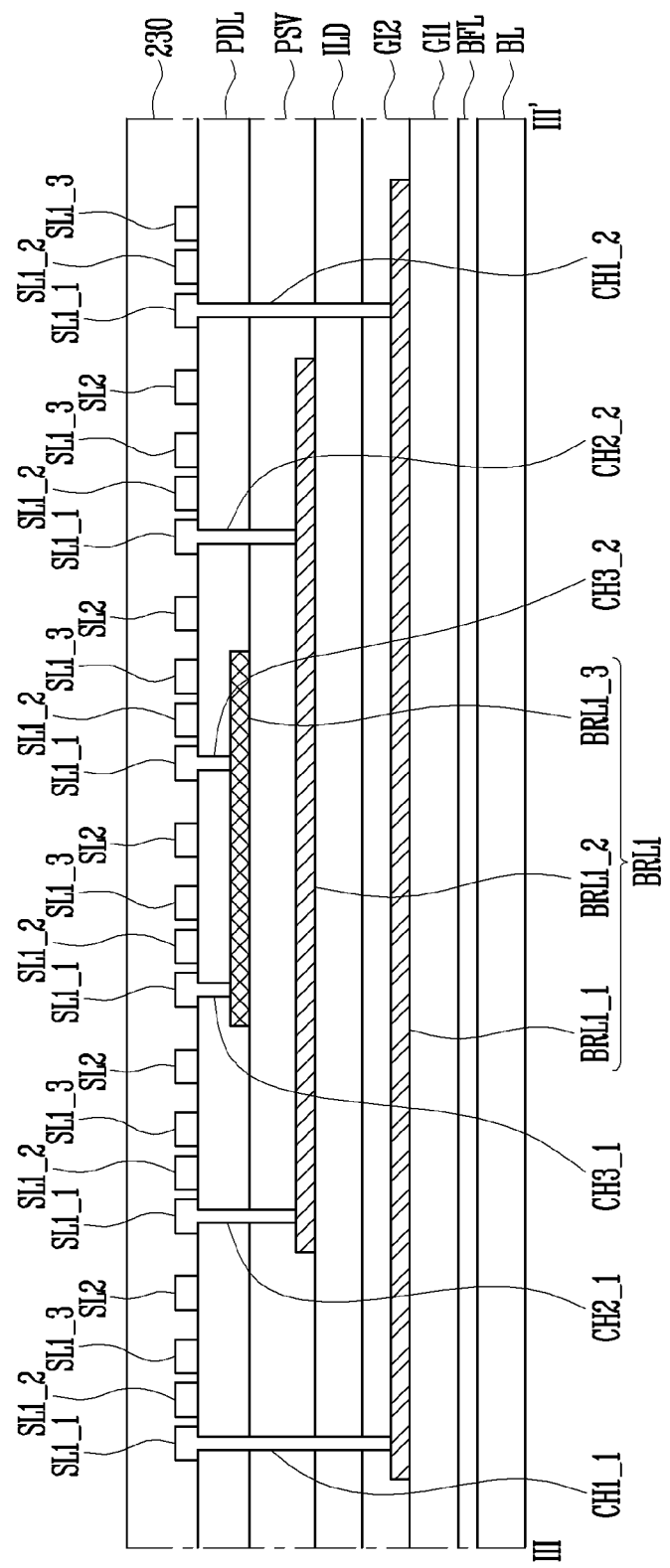
FIG. 12 illustrates a touch screen according to another exemplary embodiment, which is a cross-sectional view corresponding to line of FIG. 10A.

FIG. 10A is a plan view for illustrating a connection relationship between a sensor column, a bridge line, a contact line, and a sensing line shown in FIG. 6A. FIG. 10B is a plan view for illustrating a connection relationship between a sensor column, a bridge line, a contact line, and a sensing line shown in FIG. 6B. FIG. 11 is a cross-sectional view taken along a line III-III' of FIG. 10A. FIG. 12 illustrates a touch screen according to another exemplary embodiment, which is a cross-sectional view corresponding to a line of FIG. 10A.

Referring to FIGS. 6A, 6B, 10A, 10B, 11, and 12, the touch sensor layer 210 may include the first to sixth sensor columns SC1 to SC6 including a plurality of touch sensor blocks TSB, the first and second sensing lines SL1 and SL2 connected to the touch sensor blocks TSB, the bridge line BRL connected to the first sensing lines SL1, and the contact line CL connected to the second sensing lines SL2.

Each of the first to sixth sensor columns SC1 to SC6) may include the first touch sensor column (see TSC1 in FIG. 9A) including the first touch electrode TSE1 and the second touch sensor column (see TSC2 in FIG. 9B) including the second touch electrode TSE2. The first touch sensor column TSC1 and the second touch sensor column TSC2 may be alternately disposed in the sensing area SA.

The first touch electrode TSE1 may include the 1-1-th to 1-3-th sub-touch electrode TSE1_1, TSE1_2, and TSE1_3 sequentially disposed in the first direction DR1. For example, the 1-1-th sub-touch electrode TSE1_1 may be disposed farthest from the pad PD on the base film BF, and the 1-3-th sub-touch electrode TSE1_3 may be disposed closest to the pad PD on the base film BF.

The 1-1-th to 1-3-th sub-touch electrodes TSE1_1, TSE1_2, and TSE1_3 may be connected to the first sensing lines SL1. The first sensing lines SL1 may include the 1-1-th sensing line SL1_1 connected to the 1-1-th sub-touch electrode TSE1_1, the 1-2-th sensing line SL1_2 connected to the 1-2-th sub-touch electrode TSE1_2, and the 1-3-th sensing line SL1_3 connected to the 1-3-th sub-touch electrode TSE1_3. The 1-1-th to 1-3-th sensing lines SL1_1, SL1_2, and SL1_3 are spaced apart from each other and disposed at the same layer. Each of the 1-1-th to 1-3-th sensing lines SL1_1, SL1_2, and SL1_3 may be connected to the bridge line BRL.

The second touch electrode TSE2 may be connected to the second sensing lines SL2. The second sensing lines SL2 may be connected to the contact line CL so as to be connected to the corresponding pad SL_P of the pad PD. Therefore, the second touch electrode TSE2 may be electrically connected to the pad PD through the second sensing line SL2 and the contact lines CL.

The contact lines CL do not overlap the bridge line BRL in a plan view, and may be spaced apart from each other in the non-sensing area NSA. As shown in FIG. 10A, the contact line CL may include two groups of contact lines CL1 and CL2 that are disposed adjacent to one another and disposed at one side of the non-sensing area NSA. In this case, the second touch electrode TSE2 included in each of the first to third sensor columns SC1, SC2, and SC3 may be electrically connected to the first group of contact lines CL1 disposed at one side of the non-sensing area NSA through the second sensing lines SL2. In addition, the second touch electrode TSE2 included in each of the fourth to sixth sensor columns SC4, SC5, and SC6 may be electrically connected to the second group of contact lines CL2 disposed next to the first group of contact lines CL2 through the second sensing lines SL2.

According to an exemplary embodiment, a contact line CL, instead of multiple contact lines, may be disposed as single line shape in the second direction DR2 in the non-sensing area NSA as shown in FIG. 10B.

In an exemplary embodiment, the first and second touch electrodes TSE1 and TSE2, the first and second sensing lines SL1 and SL2, and the pad SL_P may be made of a conductive material. Metal, an alloy thereof, conductive polymer, conductive metal oxide, nano conductive material, or the like may be used as the conductive material.

The bridge line BRL may be provided as an intermediate medium for connecting the 1-1-th to 1-3-th sensing lines SL1_1, SL1_2 and SL1_3 to the pad PD.

The bridge line BRL may be disposed in the non-sensing area NSA and may include the first to third bridge lines BRL1, BRL2, and BLR3. In an exemplary embodiment, each of the first to third bridge lines BRL1, BRL2, and BRL3 may be made of multiple layers in which at least two conductive layers are stacked.

Each of the first to third bridge lines BRL1, BRL2, and BRL3 may include sub-bridge lines. Specifically, the sub-bridge line of the first bridge line BRL1 may include the 1-1-th to 1-3-th bridge lines BRL1_1, BRL1_2, and BRL1_3. The sub-bridge line of the second bridge line BRL2 may include the 2-1-th to 2-3-th bridge lines BRL2_1, BRL2_2, and BRL2_3. The sub-bridge line of the third bridge line BRL3 may include the 3-1-th to 3-3-th bridge lines BRL3_1, BRL3_2, and BRL3_3.

Each of the 1-1-th to 1-3-th bridge lines BRL1_1, BRL1_2, and BRL1_3 may extend in the second direction DR2 in the non-sensing area NSA. In addition, each of the 2-1-th to 2-3-th bridge lines BRL2_1, BRL2_2, and BRL2_3 may extend in the second direction DR2 in the non-sensing area NSA. Likewise, each of the 3-1-th to 3-3-th bridge lines BRL3_1, BRL3_2, and BRL3_3 may extend in the second direction DR2 in the non-sensing area NSA.

In an exemplary embodiment, the non-sensing area NSA may correspond to the non-display area (see NDA in FIG. 3) of the display panel (see 100 in FIG. 3). The non-display area NDA may include a valley (not shown) formed by removing a portion of the thin film encapsulation film (see TFE in FIG. 5) and a portion of an insulating layer disposed thereunder. Therefore, a portion region of the display panel 100 may be exposed to the outside in the non-display area NDA due to the valley. In an exemplary embodiment, the non-sensing area NSA may correspond to the valley of the non-display area NDA. A portion region of the display panel 100 exposed to the outside may be the upper surface of the buffer layer BFL of the display panel 100. The first to third bridge lines BRL1, BRL2, and BRL3 may be disposed directly on the upper surface of the buffer layer BFL exposed to the outside due to the valley of the non-display area NDA.

In this case, as shown in FIG. 11, the 1-1-th bridge lines BRL1_1 may be disposed on the gate insulating layer G1 disposed on the buffer layer BFL, the 1-2-th bridge line BRL1_2 may be disposed on the 1-1-th bridge line BRL1_1 with an interlayer insulating layer ILD interposed therebetween, and the 1-3-th bridge line BRL1_3 may be disposed on the 1-2-th bridge line BRL1_2 with a passivation layer PSV interposed therebetween. As such, the first bridge line BLR1 may be provided as a multilayer structure in which the 1-1-th to 1-3-th bridge lines BRL1_1, BRL1_2, and BRL1_3 are sequentially stacked.

In an exemplary embodiment, the sub-bridge lines included in each of the first to third bridge lines BRL1, BRL2, and BRL3 may overlap each other in a plan view. Specifically, the 1-1-th to 1-3-th bridge lines BRL1_1, BRL1_2, and BRL1_3 may overlap each other in a plan view. The 2-1-th to 2-3-th bridge lines BRL2_1, BRL2_2, and BRL2_3 may overlap each other in a plan view. The 3-1-th to 3-3-th bridge lines BRL3_1, BRL3_2, and BRL3_3 may overlap each other in a plan view.

The 1-1-th to 1-3-th bridge lines BRL1_1, BRL1_2, and BRL1_3 may have different width that as shown in the drawing, but the embodiments are not limited thereto. For example, the 1-1-th to 1-3-th bridge lines BRL1_1, BRL1_2, and BRL1_3 may have the same width. The 2-1-th to 2-3-th bridge lines BRL2_1, BRL2_2, and BRL2_3 may have different width or have the same width. Likewise, the 3-1-th to 3-3-th bridge lines BRL3_1, BRL3_2, and BRL3_3 may have different width or have the same width.

In an exemplary embodiment, the first sensing lines SL1 connected to the sub-touch electrodes TSE1_1, TSE1_2 and TSE1_3 of the first sensor column SC1 and the first sensing lines SL1 connected to the sub-touch electrodes TSE1_1, TSE1_2 and TSE1_3 of the sixth sensor column SC6 may be electrically connected to the same bridge line.

Specifically, the 1-1-th sensing line SL1_1 connected to the 1-1-th sub-touch electrode TSE1_1 of the first sensor column SC1 and the 1-1-th sensing line SL1_1 connected to the 1-1-th sub-touch electrode TSE1_1 of the sixth sensor column SC6 may be connected to the 1-1-th bridge line BRL1_1. Herein, the same signal may be applied to the 1-1-th sub-touch electrode TSE1_1 of the first sensor column SC1 and the 1-1-th sub-touch electrode TSE1_1 of the sixth sensor column SC6. In addition, the 1-2-th sensing line SL1_2 connected to the 1-2-th sub-touch electrode TSE1_2 of the first sensor column SC1 and the 1-2-th sensing line SL1_2 connected to the 1-2-th sub-touch electrode TSE1_2 of the sixth sensor column SC6 may be connected to the 2-1-th bridge line BRL2_1. Herein, the same signal may be applied to the 1-2-th sub-touch electrode TSE1_2 of the first sensor column SC1 and the 1-2-th sub-touch electrode TSE1_2 of the sixth sensor column SC6. The 1-3-th sensing line SL1_3 connected to the 1-3-th sub-touch electrode TSE1_3 of the first sensor column SC1 and the 1-3-th sensing line SL1_3 connected to the 1-3-th sub-touch electrode TSE1_3 of the sixth sensor column SC6 may be connected to the 3-1-th bridge line BRL3_1. Here, the same signal may be applied to the 1-3-th sub-touch electrode TSE1_3 of the first sensor column SC1 and the 1-3-th sub-touch electrode TSE1_3 of the sixth sensor column SC6.

The first sensing lines SL1 connected to the sub-touch electrodes TSE1_1, TSE1_2 and TSE1_3 of the second sensor column SC2 and the first sensing lines SL1 connected to the sub-touch electrodes TSE1_1, TSE1_2 and TSE1_3 of the fifth sensor column SC5 may be electrically connected to the same bridge line.

Specifically, the 1-1-th sensing line SL1_1 connected to the 1-1-th sub-touch electrode TSE1_1 of the second sensor column SC2 and the 1-1-th sensing line SL1_1 connected to the 1-1-th sub-touch electrode TSE1_1 of the fifth sensor column SC5 may be connected to the 1-2-th bridge line BRL1_2. Herein, the same signal may be applied to the 1-1-th sub-touch electrode TSE1_1 of the second sensor column SC2 and the 1-1-th sub-touch electrode TSE1_1 of the fifth sensor column SC5. In addition, the 1-2-th sensing line SL1_2 connected to the 1-2-th sub-touch electrode TSE1_2 of the second sensor column SC2 and the 1-2-th sensing line SL1_2 connected to the 1-2-th sub-touch electrode TSE1_2 of the fifth sensor column SC5 may be connected to the 2-2-th bridge line BRL2_2. Herein, the same signal may be applied to the 1-2-th sub-touch electrode TSE1_2 of the second sensor column SC2 and the 1-2-th sub-touch electrode TSE1_2 of the fifth sensor column SC5. The 1-3-th sensing line SL1_3 connected to the 1-3-th sub-touch electrode TSE1_3 of the second sensor column SC2 and the 1-3-th sensing line SL1_3 connected to the 1-3-th sub-touch electrode TSE1_3 of the fifth sensor column SC5 may be connected to the 3-2-th bridge line BRL3_2. Here, the same signal may be applied to the 1-3-th sub-touch electrode TSE1_3 of the second sensor column SC2 and the 1-3-th sub-touch electrode TSE1_3 of the fifth sensor column SC5.

The first sensing lines SL1 connected to the sub-touch electrodes TSE1_1, TSE1_2 and TSE1_3 of the third sensor column SC3 and the first sensing lines SL1 connected to the sub-touch electrodes TSE1_1, TSE1_2 and TSE1_3 of the fourth sensor column SC4 may be electrically connected to the same bridge line.

Specifically, the 1-1-th sensing line SL1_1 connected to the 1-1-th sub-touch electrode TSE1_1 of the third sensor column SC3 and the 1-1-th sensing line SL1_1 connected to the 1-1-th sub-touch electrode TSE1_1 of the fourth sensor column SC4 may be connected to the 1-3-th bridge line BRL1_3. Herein, the same signal may be applied to the 1-1-th sub-touch electrode TSE1_1 of the third sensor column SC3 and the 1-1-th sub-touch electrode TSE1_1 of the fourth sensor column SC4. In addition, the 1-2-th sensing line SL1_2 connected to the 1-2-th sub-touch electrode TSE1_2 of the third sensor column SC3 and the 1-2-th sensing line SL1_2 connected to the 1-2-th sub-touch electrode TSE1_2 of the fourth sensor column SC4 may be connected to the 2-3-th bridge line BRL2_3. Herein, the same signal may be applied to the 1-2-th sub-touch electrode TSE1_2 of the third sensor column SC3 and the 1-2-th sub-touch electrode TSE1_2 of the fourth sensor column SC4. The 1-3-th sensing line SL1_3 connected to the 1-3-th sub-touch electrode TSE1_3 of the third sensor column SC3 and the 1-3-th sensing line SL1_3 connected to the 1-3-th sub-touch electrode TSE1_3 of the fourth sensor column SC4 may be connected to the 3-3-th bridge line BRL3_3. Here, the same signal may be applied to the 1-3-th sub-touch electrode TSE1_3 of the third sensor column SC3 and the 1-3-th sub-touch electrode TSE1_3 of the fourth sensor column SC4.

Hereinafter, referring to FIG. 11, the first bridge line BRL1 and the first sensing line SL1 will be described in the stacking order.

The buffer layer BFL may be disposed on the base layer BL.

The gate insulating layer GI may be disposed on the buffer layer BFL.

The 1-1-th bridge line BRL1_1 may be disposed on the gate insulating layer GI. The 1-1-th bridge line BRL1_1 may be provided at the same layer as the first and second gate electrodes (see GE1 and GE2 in FIG. 5) provided in the display area (see DA in FIG. 5) of the display panel 100. That is, the 1-1-th bridge line BRL1_1 may be provided at the same layer as the first and second gate electrodes GE1 and GE2 and may be made of the same material. In addition, as shown in FIG. 12, when the first and second gate insulating layers GI1 and GI2 are disposed on the buffer layer BFL, the 1-1-th bridge line BRL1_1 may be disposed between the first gate insulating layer GI1 and the second gate insulating layer GI2.

The interlayer insulating layer ILD may be disposed on the 1-1-th bridge line BRL1_1.

The 1-2-th bridge line BRL1_2 may be disposed on the interlayer insulating layer ILD. The 1-2-th bridge lines BRL1_2 may be provided at the same layer at the first and second source electrodes (see SE1 and SE2 in FIG. 5) and the first and second drain electrodes (see DE1 and DE2 in FIG. 5) provided in the display area DA. That is, the 1-2-th bridge lines BRL1_2 may be provided at the same layer as the first and second source electrodes SE1 and SE2 and the first and second drain electrodes DE1 and DE2, and may be made of the same material.

The passivation layer PSV may be disposed on the 1-2-th bridge line BRL1_2.

The 1-3-th bridge line BRL1_3 may be disposed on the passivation layer PSV. The 1-3-th bridge line BRL1_3 may be provided at the same layer as the first electrode (see AE in FIG. 5) provided in the display area DA. That is, the 1-3-th bridge line BRL1_3 may be provided at the same layer as the first electrode AE, and may be made of the same material.

A pixel definition layer PDL may be disposed on the 1-3-th bridge line BRL1_3.

The 1-1-th to 1-3-th sensing lines SL1_1, SL1_2 and SL1_3 and the second sensing lines SL2 may be disposed on the pixel definition layer PDL.

The 1-1-th sensing line SL1_1 (hereinafter referred to as a "the first sub-sensing line") connected to the 1-1-th sub-touch electrode TSE1_1 of the first sensor column SC1 may be connected to the 1-1-th bridge line BRL1_1 through the 1-1-th contact hole CH1_1 sequentially passing through the pixel definition layer PDL, the passivation PSV, and the interlayer insulating layer ILD. The 1-1-th sensing line SL1_1 (hereinafter referred to as a "the sixth sub-sensing line") connected to the 1-1-th sub-touch electrode TSE1_1 of the sixth sensor column SC6 may be connected to the 1-1-th bridge line BRL1_1 through the 1-2-th contact hole CH1_2 sequentially passing through the pixel definition layer PDL, the passivation layer PSV, and the interlayer insulating layer ILD. As a result, the first sub-sensing line SL1_1 and the sixth sub-sensing line SL1_1 may be electrically connected to the same 1-1-th bridge line BRL1_1. The 1-1-th bridge line BRL1_1 may be connected to the pad PD through the fourth sensing line SL4. Therefore, the first sub-sensing line SL1_1 and the sixth sub-sensing line SL1_1 may be electrically connected to the pad PD.

The 1-1-th sensing line SL1_1 (hereinafter referred to as a "the second sub-sensing line") connected to the 1-1-th sub-touch electrode TSE1_1 of the second sensor column SC2 may be connected to the 1-2-th bridge line BRL1_2 through the 2-1-th contact hole CH2_1 sequentially passing through the pixel definition layer PDL and the passivation layer PSV. The 1-1-th sensing line SL1_1 (hereinafter referred to as "the fifth sub-sensing line") connected to the 1-1-th sub-touch electrode TSE1_1 of the fifth sensor column SC5 may be connected to the 1-2-th bridge line BRL1_2 through the 2-2-th contact hole CH2_2 sequentially passing through the pixel definition layer PDL and the passivation layer PSV. As a result, the second sub-sensing line SL1_1 and the fifth sub-sensing line SL1_1 may be electrically connected to the same 1-2-th bridge line BRL1_2. The 1-2-th bridge line BRL1_2 may be connected to the pad PD through the fourth sensing line SL4. Therefore, the second sub-sensing line SL1_1 and the fifth sub-sensing line SL1_1 may be electrically connected to the pad PD.

The 1-1-th sensing line SL1_1 (hereinafter referred to as a "the third sub-sensing line") connected to the 1-1-th sub-touch electrode TSE1_1 of the third sensor column SC3 may be connected to the 1-3-th bridge line BRL1_3 through the 3-1-th contact hole CH3_1 passing through the pixel definition layer PDL. The 1-1-th sensing line SL1_1 (hereinafter referred to as a "the fourth sub-sensing line") connected to the 1-1-th sub-touch electrode TSE1_1 of the fourth sensor column SC4 may be connected to the 1-3-th bridge line BRL1_3 through the 3-2-th contact hole CH3_2 passing through the pixel definition layer PDL. As a result, the third sub-sensing line SL1_1 and the fourth sub-sensing line SL1_1 may be electrically connected to the same 1-3-th bridge line BRL1_3. The 1-3-th bridge line BRL1_3 may be connected to the pad PD through the fourth sensing line SL4. Therefore, the third sub-sensing line SL1_1 and the fourth sub-sensing line SL1_1 may be electrically connected to the pad PD.

The insulating layer 230 may be disposed on the 1-1-th to 1-3-th sensing lines SL1_1, SL1_2 and SL1_3 and the second sensing lines SL2.

Meanwhile, the 1-1-th bridge line BRL1_1 may be made of the same material as the 2-1-th bridge line BRL2_1 of the second bridge line BRL2 and the 3-1-th bridge line BRL3_1 of the third bridge line BRL3, and may be formed by using the same process as used to form the 2-1-th bridge line BRL2_1 of the second bridge line BRL2 and the 3-1-th bridge line BRL3_1 of the third bridge line BRL3. Therefore, the 2-1-th bridge line BRL2_1 and the 3-1-th bridge line BRL3_1 may be made of the same material as the first and second gate electrodes GE1 and GE2, and may be provided on the same layer as the first and second gate electrodes GE1 and GE2. In other words, the 2-1-th bridge line BRL2_1 and the 3-1-th bridge line BRL3_1 may be disposed on the gate insulating layer G1.

The 1-2-th bridge line BRL1_2 may be made of the same material as the 2-2-th bridge line BRL2_2 of the second bridge line BRL2 and the 3-2-th bridge line BRL3_2 of the third bridge line BRL3, and may be formed by using the same process used to form the 2-2-th bridge line BRL2_2 of the second bridge line BRL2 and the 3-2-th bridge line BRL3_2 of the third bridge line BRL3. Therefore, the 2-2-th bridge line BRL2_2 and the 3-2-th bridge line BRL3_2 may be made of the same material as the first and second source electrodes SE1 and SE2 and the first and second drain electrodes DE1 and DE2, and may be provided on the same layer as the first and second source electrodes SE1 and SE2 and the first and second drain electrodes DE1 and DE2. In other words, the 2-2-th bridge line BRL2_2 and the 3-2-th bridge line BRL3_2 may be disposed on the interlayer insulating layer ILD.

The 1-3-th bridge line BRL1_3 may be made of the same material as the 2-3-th bridge line BRL2_2 of the second bridge line BRL2 and the 3-3-th bridge line BRL3_3 of the third bridge line BRL3, and may be formed by using the same process used to form the 2-3-th bridge line BRL2_2 of the second bridge line BRL2 and the 3-3-th bridge line BRL3_3 of the third bridge line BRL3. Therefore, the 2-3-th bridge line BRL2_3 and the 3-3-th bridge line BRL3_3 may be made of the same material as the first electrode AE, and may be provided on the same layer as the first electrode AE. In other words, the 2-3-th bridge line BRL2_3 and the 3-3-th bridge line BRL3_3 may be disposed on the passivation layer PSV.

As described above, the 1-1-th to 1-3-th bridge lines BRL1_1, BRL1_2, and BRL1_3 are disposed so as to overlap each other in a plan view, so that the first bridge line BRL1 may be provided as a single line shape in the non-sensing area NSA. In addition, the 2-1-th to 2-3-th bridge lines BRL2_1, BRL2_2, and BRL2_3 are disposed so as to overlap each other in a plan view, so that the second bridge line BRL2 may be provided as the shape of a single line in the non-sensing area NSA. Likewise, the 3-1-th to 3-3-th bridge lines BRL3_1, BRL3_2, and BRL3_3 are disposed so as to overlap each other in a plan view, so that the third bridge line BRL3 may be provided as a single line shape in the non-sensing area NSA. In this case, the area occupied by the first to third bridge lines BRL1, BRL2, and BRL3 may be minimized in the non-sensing area NSA.

If sub-bridge lines included in each of the first to third bridge lines BRL1, BRL2, and BRL3 are made of the same material and are formed by using the same process, the area occupied by the first to third bridge lines BRL1, BRL2, and BRL3 may be increased in the non-sensing area NSA.

For example, If the 1-1-th to 1-3-th bridge lines BRL1_1, BRL1_2, and BRL1_3 are made of the same material and are formed by using the same process, the 1-1-th to 1-3-th bridge lines BRL1_1, BRL1_2, and BRL1_3 may be spaced apart from each other on the same plane in the non-sensing area NSA. In this case, the first bridge line BRL1 including the 1-1-th to 1-3-th bridge lines BRL1_1, BRL1_2, and BRL1_3 may be provided as the shape of three lines in the non-sensing area NSA. In addition, the second bridge line BRL2 including the 2-1-th to 2-3-th bridge lines BRL2_1, BRL2_2, and BRL2_3 may be provided as the shape of three lines in the non-sensing area NSA. Likewise, the third bridge line BRL3 including the 3-1-th to 3-3-th bridge lines BRL3_1, BRL3_2, and BRL3_3 may be provided as the shape of three lines in the non-sensing area NSA. As a result, since the first to third bridge lines BRL1, BRL2, and BRL3 are disposed as the shape of nine lines in the non-sensing area NSA, the area occupied by the first to third bridge lines BRL1, BRL2, and BRL3 may be increased in the non-sensing area NSA. Therefore, the dead space of the non-sensing area NSA may be increased.

In an exemplary embodiment, the sub-bridge lines included in each of the first to third bridge lines BRL1, BRL2 and BRL3 are made of a different material and overlap each other in a plan view, thereby minimizing the dead space of the non-sensing area NSA.

The display device according to an exemplary embodiment may be applied to various electronic devices. For example, the display device may be applied to a television, a notebook, a mobile phone, a smart phone, a smart pad, a PMP, a PDA, a navigation device, various wearable devices such as a smart watch, and the like.

Although certain exemplary embodiments and implementations have been described herein, other embodiments and modifications will be apparent from this description. Accordingly, the inventive concepts are not limited to such embodiments, but rather to the broader scope of the presented claims and various obvious modifications and equivalent arrangements.

Accordingly, the technical scope of the present disclosure may be determined by on the technical scope of the accompanying claims.

What is claimed is:

1. A touch screen, comprising:
   a base film comprising a sensing area and a non-sensing area;
   a plurality of first touch sensor columns comprising a plurality of first touch electrodes, each of the first touch electrodes comprising a plurality of sub-touch electrodes disposed in the sensing area and extended in a first direction;
   a plurality of second touch sensor columns comprising a plurality of second touch electrodes disposed in the sensing area, extended in the first direction, and disposed alternately with the plurality of first touch sensor columns;
   a plurality of first sensing lines extended in the first direction in the sensing area, each first sensing line configured to connect one sub-touch electrode of each of the plurality of first touch electrodes in each first sensor column;
   a plurality of second sensing lines extended in the first direction in the sensing area to connect to each second touch electrode of the plurality of second electrodes in each second sensor column;
   a first pad disposed in the non-sensing area, directly connected to a third sensing line, and electrically connected to each first sensing line;
   a second pad disposed in the non-sensing area and electrically connected to each second sensing line;
   a bridge line disposed entirely in the non-sensing area, extended in a second direction perpendicular to the first direction, and directly connected to each first sensing line and the third sensing line;
   a contact line disposed in the non-sensing area and extended in the second direction;
   the third sensing line disposed between the bridge line and the first pad in the non-sensing area and electrically connecting the bridge line and the first pad; and
   at least one fourth sensing line disposed between the contact line and the second pad in the non-sensing area and electrically connecting the contact line and the second pad,
   wherein the bridge line comprises a multilayer structure in which at least two sub-bridge lines corresponding to different first sensor columns are stacked to overlap each other in a plan view, and
   wherein each second touch electrode has a corresponding first touch electrode with its respective plurality of sub-touch electrodes directly adjacent thereto.

2. The touch screen of claim 1, wherein the bridge line comprises:
   a first sub-bridge line;
   a second sub-bridge line disposed on the first sub-bridge line with a first insulating layer interposed therebetween; and
   a third sub-bridge line disposed on the second sub-bridge line with a second insulating layer interposed therebetween.

3. The touch screen of claim 2, wherein the first sub-bridge line, the second sub-bridge line, and the third sub-bridge line overlap each other in the plan view.

4. The touch screen of claim 3, wherein:
   in each of the plurality of first touch sensor columns, one first touch electrode comprises i sub-touch electrodes, where i is a natural number greater than or equal to 2, sequentially disposed in the first direction in which the plurality of first touch sensor columns extends, and
   a first sub-touch electrode, among the i sub-touch electrodes of a first first touch electrode, is electrically connected through one of the first sensing lines to a second sub-touch electrode, among i sub-touch electrodes of a second first touch electrode that is adjacent to the first first touch electrode and is in a same first touch sensor column as the first first touch electrode.

5. The touch screen of claim 4, wherein a same signal is applied to the first sub-touch electrode and the second sub-touch electrode through the bridge line.

6. The touch screen of claim 5,
   wherein the contact line is electrically connecting each second sensing line and the at least one fourth sensing line.

7. The touch screen of claim 6, wherein:
   each of the second touch sensor columns comprises q second touch electrodes, where q is a natural number greater than or equal to 2, and
   each second touch electrode, of the q second touch electrodes, is electrically connected to the second pad through the contact line.

8. The touch screen of claim 1, wherein the plurality of first touch electrodes and the plurality of the second touch electrodes are disposed on a same layer.

9. A display device, comprising:
   a display panel; and
   a touch screen disposed on at least one side of the display panel, the touch screen comprising:
      a base film comprising a sensing area and a non-sensing area;
      a plurality of first touch sensor columns comprising a plurality of first touch electrodes, each of the first touch electrodes comprising a plurality of sub-touch electrodes disposed in the sensing area and extended in a first direction;
      a plurality of second touch sensor columns comprising a plurality of second touch electrodes disposed in the sensing area, extended in the first direction, and disposed alternately with the plurality of first touch sensor columns;
      a plurality of first sensing lines extended in the first direction in the sensing area, each first sensing line configured to connect one sub-touch electrode of each of the plurality of first touch electrodes in each first sensor column;
      a plurality of second sensing lines extended in the first direction in the sensing area to connect to each second touch electrode of the plurality of second electrodes in each second sensor column;
      a first pad disposed in the non-sensing area, directly connected to a third sensing line, and electrically connected to each first sensing line;
      a second pad disposed in the non-sensing area and electrically connected to each second sensing line; and
      a bridge line disposed entirely in the non-sensing area, extended in a second direction perpendicular to the first direction, and directly connected to each first sensing line and the third sensing line;
      a contact line disposed in the non-sensing area and extended in the second direction;

the third sensing line disposed between the bridge line and the first pad in the non-sensing area and electrically connecting the bridge line and the first pad; and at least one fourth sensing line disposed between the contact line and the second pad in the non-sensing area and electrically connecting the contact line and the second pad, wherein the bridge line comprises a multilayer structure in which at least two sub-bridge lines corresponding to different first sensor columns are stacked to overlap each other in a plan view, and wherein each second touch electrode has a corresponding first touch electrode with its respective plurality of sub-touch electrodes directly adjacent thereto.

10. The display device of claim 9, wherein the display panel comprises:

a base layer comprising a display area and a non-display area;

a transistor disposed on the base layer;

a light emitting element electrically connected to the transistor; and a thin film encapsulation film covering the light emitting element, wherein the thin film encapsulation film is the base film of the sensing area.

11. The display device of claim 10, wherein the transistor comprises:

a semiconductor layer disposed on the base layer;

a gate electrode disposed on the semiconductor layer with a gate insulating layer interposed therebetween;

a source electrode and a drain electrode connected to the semiconductor layer with an interlayer insulating layer interposed therebetween, one of the source electrode and the drain electrode is connected to the light emitting element.

12. The display device of claim 11, wherein the light emitting element comprises:

a first electrode connected to the transistor with a protective layer interposed therebetween;

an emission layer disposed on the first electrode; and a second electrode disposed on the emission layer.

13. The display device of claim 12, wherein the bridge line comprises:

a first sub-bridge line disposed on the gate insulating layer;

a second sub-bridge line disposed on the first sub-bridge line with the interlayer insulating layer interposed therebetween; and a third sub-bridge line disposed on the second sub-bridge line with the protective layer interposed therebetween.

14. The display device of claim 13, wherein the first sub-bridge line is disposed on a same layer as the gate electrode, the second sub-bridge line is disposed on a same layer as the source electrode and the drain electrode, and the third sub-bridge line is disposed on a same layer as the first electrode.

15. The display device of claim 14, wherein the first sub-bridge line, the second sub-bridge line, and the third sub-bridge line overlap each other in the plan view.

16. The display device of claim 9, wherein:

in each first touch sensor column, of the plurality of first touch sensor columns, one first touch electrode comprises i sub-touch electrodes, where i is a natural number greater than or equal to 2, sequentially disposed in the first direction in which the plurality of first touch sensor columns extend, and a first sub-touch electrode, among the i sub-touch electrodes of a first first touch electrode, is electrically connected through one of the first sensing lines to a second sub-touch electrode, among i sub-touch electrodes of a second first touch electrode that is adjacent to the first first touch electrode and is in a same first touch sensor column as the first first touch electrode.

17. The display device of claim 16, wherein a same signal is applied to the first sub-touch electrode and the second sub-touch electrode through the bridge line.

18. The display device of claim 17, wherein:

each second touch sensor column, of the second touch sensor columns, comprises q second touch electrodes, where q is a natural number greater than or equal to 2, and each second touch electrode, of the q second touch electrodes, is electrically connected to the second pad through one of the second sensing lines.

19. The display device of claim 18, wherein the contact line is electrically connecting each second sensing line and the at least one fourth sensing line.

* * * * *